US011267358B2

(12) United States Patent
Smolenaers

(10) Patent No.: US 11,267,358 B2
(45) Date of Patent: Mar. 8, 2022

(54) VEHICLE CHARGING STATION

(71) Applicant: INVERTEDPOWER PTY LTD, Heidelberg West (AU)

(72) Inventor: Stefan Smolenaers, Heidelberg West (AU)

(73) Assignee: INVERTEDPOWER PTY LTD, Heidelberg West (AU)

( * ) Notice: Subject to any disclaimer, the term of this patent is extended or adjusted under 35 U.S.C. 154(b) by 50 days.

(21) Appl. No.: 16/612,354

(22) PCT Filed: May 8, 2018

(86) PCT No.: PCT/AU2018/000065
§ 371 (c)(1),
(2) Date: Nov. 8, 2019

(87) PCT Pub. No.: WO2018/204964
PCT Pub. Date: Nov. 15, 2018

(65) Prior Publication Data
US 2020/0164755 A1 May 28, 2020

(30) Foreign Application Priority Data

May 8, 2017 (AU) ................................ 2017901696
Jul. 17, 2017 (AU) ................................ 2017902796

(51) Int. Cl.
*H02J 7/00* (2006.01)
*B60L 53/53* (2019.01)
(Continued)

(52) U.S. Cl.
CPC ............... *B60L 53/53* (2019.02); *B60L 50/60* (2019.02); *B60L 53/16* (2019.02); *B60L 53/305* (2019.02);
(Continued)

(58) Field of Classification Search
CPC .................. B60L 53/53; H02J 7/022
(Continued)

(56) References Cited

U.S. PATENT DOCUMENTS 2,358,304 A  9/1944 Cogsdill
4,258,304 A  3/1981 Bourke
(Continued)

FOREIGN PATENT DOCUMENTS

CN  101633309 A   1/2010
CN  201639546 U  11/2010
(Continued)

OTHER PUBLICATIONS

ISA Australian Patent Office, International Search Report Issued in Application No. PCT/AU2018/000065, Jul. 18, 2018, WIPO, 3 pages.
(Continued)

*Primary Examiner* — Suchin Parihar
(74) *Attorney, Agent, or Firm* — McCoy Russell LLP

(57) ABSTRACT

A charging station for an electric vehicle, wherein the electric vehicle and the charging station each have couplers and & communication modules. The couplers are releasably coupled for transfer of energy & the communication modules communicate the charging data. The charging station further include: an interface connects with an external source of electrical energy; a control module provides control signals and a switching module is responsive to the control signals for selectively connecting the second coupler and the interface for allowing the transfer of energy between the couplers; and operating in: a first mode to allow provide at least one of a regulated the coupler current or and the coupler voltage to be regulated; or a second mode to allow the provide an unregulated coupler current or and the coupler voltage to be unregulated.

15 Claims, 8 Drawing Sheets

(51) Int. Cl.
*B60L 53/51* (2019.01)
*B60L 53/62* (2019.01)
*H02J 7/02* (2016.01)
*B60L 53/66* (2019.01)
*B60L 53/30* (2019.01)
*B60L 53/16* (2019.01)
*B60L 50/60* (2019.01)
*B60L 53/55* (2019.01)
*B60K 6/28* (2007.10)
*B60L 53/56* (2019.01)
*B60L 53/12* (2019.01)

(52) U.S. Cl.
CPC ............ *B60L 53/51* (2019.02); *B60L 53/62* (2019.02); *B60L 53/66* (2019.02); *H02J 7/022* (2013.01); *B60K 6/28* (2013.01); *B60L 53/12* (2019.02); *B60L 53/55* (2019.02); *B60L 53/56* (2019.02); *B60Y 2200/91* (2013.01); *B60Y 2200/92* (2013.01); *B60Y 2300/91* (2013.01)

(58) Field of Classification Search
USPC ........................................................ 320/109
See application file for complete search history.

(56) References Cited

U.S. PATENT DOCUMENTS

| | | |
|---|---|---|
| 4,536,696 A | 8/1985 | Ray |
| 4,920,475 A | 4/1990 | Rippel |
| 5,017,800 A | 5/1991 | Divan |
| 5,099,186 A | 3/1992 | Rippel et al. |
| 5,182,508 A | 1/1993 | Schauder |
| 5,235,504 A | 8/1993 | Sood |
| 5,291,388 A | 3/1994 | Heinrich |
| 5,341,075 A | 8/1994 | Cocconi |
| 5,373,195 A | 12/1994 | De Doncker et al. |
| 5,412,557 A | 5/1995 | Lauw |
| 5,500,579 A | 3/1996 | Kim et al. |
| 5,504,414 A | 4/1996 | Kinoshita |
| 5,546,295 A | 8/1996 | Prete et al. |
| 5,583,385 A | 12/1996 | Horie et al. |
| 5,642,270 A | 6/1997 | Green et al. |
| 5,717,303 A | 2/1998 | Engel |
| 5,734,237 A | 3/1998 | Engel |
| 5,875,106 A | 2/1999 | Tenconi et al. |
| 6,002,603 A | 12/1999 | Carver |
| 6,031,738 A | 2/2000 | Lipo et al. |
| 6,496,393 B1 | 12/2002 | Patwardhan |
| 6,608,396 B2 | 8/2003 | Downer et al. |
| 6,724,100 B1 | 4/2004 | Gabriel |
| 6,822,866 B2 | 11/2004 | Fearing et al. |
| 7,012,822 B2 | 3/2006 | Zhu et al. |
| 7,327,113 B2 | 2/2008 | Steigerwald et al. |
| 7,443,125 B2 | 10/2008 | Clothier et al. |
| 7,595,606 B2 | 9/2009 | Loubeyre |
| 7,832,513 B2 | 11/2010 | Verbrugge et al. |
| 7,859,201 B2 | 12/2010 | Oyobe et al. |
| 7,977,819 B2 | 7/2011 | Kitanaka |
| 8,080,973 B2 | 12/2011 | King et al. |
| 8,098,056 B2 | 1/2012 | Yamazaki et al. |
| 8,138,694 B2 | 3/2012 | Steigerwald et al. |
| 8,143,856 B2 | 3/2012 | Andrea et al. |
| 8,217,616 B2 | 7/2012 | Rozman et al. |
| 8,232,669 B2 | 7/2012 | Chen et al. |
| 8,299,739 B2 | 10/2012 | Kakebayashi et al. |
| 8,395,910 B2 | 3/2013 | Alexander |
| 8,405,327 B2 | 3/2013 | Liang et al. |
| 8,415,904 B2 | 4/2013 | Rippel |
| 8,421,271 B2 | 4/2013 | King et al. |
| 8,432,126 B2 | 4/2013 | Hasan et al. |
| 8,466,652 B2 | 6/2013 | Klaes |
| 8,547,051 B2 | 10/2013 | Green et al. |
| 8,638,069 B2 | 1/2014 | Krauer |
| 8,653,696 B2 | 2/2014 | King et al. |
| 8,736,203 B2 | 5/2014 | Jang et al. |
| 8,772,984 B2 | 7/2014 | Chang |
| 8,847,555 B2 | 9/2014 | Loudot et al. |
| 8,963,365 B2 | 2/2015 | King et al. |
| 9,000,740 B2 | 4/2015 | Touzani et al. |
| 9,018,809 B2 | 4/2015 | Rippel et al. |
| 9,045,046 B2 | 6/2015 | Januschevski et al. |
| 9,312,692 B2 | 4/2016 | Feuerstack et al. |
| 9,457,672 B2 | 10/2016 | Chang |
| 10,097,078 B2 | 10/2018 | Rayner et al. |
| 10,498,221 B2 | 12/2019 | Rayner et al. |
| 2002/0158606 A1 | 10/2002 | King |
| 2002/0185989 A1 | 12/2002 | Rahman et al. |
| 2004/0062059 A1 | 4/2004 | Cheng et al. |
| 2006/0226703 A1 | 10/2006 | Schreiber |
| 2007/0029986 A1 | 2/2007 | Nakamura et al. |
| 2007/0247104 A1 | 10/2007 | Garza |
| 2008/0238372 A1 | 10/2008 | Cintra et al. |
| 2010/0045248 A1 | 2/2010 | Hawley |
| 2010/0244775 A1 | 9/2010 | Smith |
| 2012/0019212 A1 | 1/2012 | Krauer |
| 2012/0049820 A1 | 3/2012 | Moussaoui et al. |
| 2012/0062176 A1 | 3/2012 | Hasan et al. |
| 2012/0181975 A1 | 7/2012 | Loudot et al. |
| 2012/0274246 A1 | 11/2012 | Radulescu |
| 2012/0286740 A1 | 11/2012 | Loudot et al. |
| 2013/0002197 A1 | 1/2013 | Hernandez et al. |
| 2013/0020993 A1 | 1/2013 | Taddeo et al. |
| 2013/0049674 A1* | 2/2013 | Davis ............... H02J 7/025 320/101 |
| 2013/0049677 A1 | 2/2013 | Bouman |
| 2013/0069588 A1 | 3/2013 | Oda et al. |
| 2013/0162221 A1 | 6/2013 | Jefferies et al. |
| 2013/0193276 A1 | 8/2013 | Hunter |
| 2013/0214729 A1 | 8/2013 | Gati et al. |
| 2013/0249485 A1* | 9/2013 | Bohm ............... H02J 7/007 320/109 |
| 2013/0293163 A1 | 11/2013 | Flett |
| 2013/0320912 A1 | 12/2013 | Feuerstack et al. |
| 2014/0062394 A1 | 3/2014 | Khan et al. |
| 2014/0062396 A1 | 3/2014 | Reddy |
| 2014/0191582 A1 | 7/2014 | Deboy et al. |
| 2014/0232301 A1 | 8/2014 | Dittmer et al. |
| 2014/0265971 A1 | 9/2014 | Taube et al. |
| 2015/0008748 A1 | 1/2015 | Deboy et al. |
| 2015/0015072 A1 | 1/2015 | Deboy et al. |
| 2015/0016159 A1 | 1/2015 | Deboy et al. |
| 2015/0042159 A1 | 2/2015 | Kim et al. |
| 2015/0042278 A1 | 2/2015 | Leary |
| 2015/0069934 A1 | 3/2015 | Gardner et al. |
| 2015/0069936 A1 | 3/2015 | Jang et al. |
| 2015/0137751 A1 | 5/2015 | King et al. |
| 2015/0146457 A1 | 5/2015 | Strijker |
| 2017/0088001 A1 | 3/2017 | Haas et al. |
| 2017/0106764 A1 | 4/2017 | Beaston et al. |
| 2017/0366039 A1* | 12/2017 | Qin ............... H02J 3/36 |
| 2020/0298722 A1* | 9/2020 | Smolenaers ............... B60L 53/24 |

FOREIGN PATENT DOCUMENTS

| | | |
|---|---|---|
| CN | 102390272 A | 3/2012 |
| CN | 102457182 A | 5/2012 |
| CN | 102826054 A | 12/2012 |
| CN | 202634360 U | 12/2012 |
| CN | 203032409 U | 7/2013 |
| CN | 203211118 U | 9/2013 |
| CN | 103647465 A | 3/2014 |
| CN | 103647483 A | 3/2014 |
| CN | 203708127 U | 7/2014 |
| CN | 203708154 U | 7/2014 |
| CN | 203708217 U | 7/2014 |
| CN | 204290428 U | 4/2015 |
| DE | 4013506 A1 | 10/1991 |
| DE | 102012201617 A1 | 8/2013 |
| EP | 0593472 B1 | 4/1995 |
| EP | 0834977 A2 | 4/1998 |
| EP | 1657807 A2 | 5/2006 |
| EP | 2406098 B1 | 8/2013 |
| FR | 2720201 A1 | 11/1995 |

(56) References Cited

FOREIGN PATENT DOCUMENTS

| | | |
|---|---|---|
| FR | 2738964 A1 | 3/1997 |
| IN | 01381MU2013 A | 4/2015 |
| JP | H06133564 A | 5/1994 |
| JP | H06292304 A | 10/1994 |
| JP | 2002176704 A | 6/2002 |
| JP | 2014103752 A | 6/2014 |
| MY | 149800 A | 10/2013 |
| WO | 9301650 A1 | 1/1993 |
| WO | 2004009397 A1 | 1/2004 |
| WO | 2011159241 A1 | 12/2011 |
| WO | 2013029891 A2 | 3/2013 |
| WO | 2014177803 A2 | 11/2014 |
| WO | 2015024508 A1 | 2/2015 |
| WO | 2017041144 A1 | 3/2017 |
| WO | 2017060249 A1 | 4/2017 |
| WO | 2018204964 A1 | 11/2018 |

OTHER PUBLICATIONS

Liu, T. et al., "Implementation of an Integrated Battery-Charger for an Electric-Propulsion System," Proceedings of the 40th Annual Conference of the IEEE Industrial Electronics Society (IECON 2014), Oct. 29, 2014, Dallas, Texas, 6 pages.

Liu, T. et al., "Integrated battery charger with power factor correction for electric-propulsion systems," IET Electric Power Applications, vol. 9, No. 3, Mar. 9, 2015, 10 pages.

ISA Australian Patent Office, International Search Report Issued in Application No. PCT/AU2016/050852, dated Dec. 5, 2016, WIPO, 3 pages.

European Patent Office, Extended European Search Report Issued in Application No. 16843306.8, dated Dec. 17, 2018, Germany, 13 pages.

\* cited by examiner

VEHICLE CHARGING STATION

CROSS-REFERENCE TO RELATED APPLICATIONS

The present application is a U.S. National Phase of International Patent Application Serial No. PCT/AU2018/000065 entitled "A VEHICLE CHARGING STATION," filed on May 8, 2018. International Patent Application Serial No. PCT/AU2018/000065 claims priority to Australian Patent Application No. 2017901696 filed on May 8, 2017 and Australian Patent Application No. 2017902796 filed on Jul. 17, 2017. The entire contents of each of the above-referenced applications are hereby incorporated by reference for all purposes.

FIELD OF THE INVENTION

The present invention relates to a vehicle charging station.
The invention has been developed primarily for use with plug-in electric vehicles and will be described hereinafter with reference to that application. However, it will be appreciated that the invention is not limited to these particular fields of use and is also applicable to other vehicular uses such as plug-in hybrid electric vehicles, whether for private, commercial or other use. The invention is also applicable to non-vehicle uses such pumps, compressors, and many other applications of portable and fixed electric machines in many different industries.

BACKGROUND

Any discussion of the background art throughout the specification should in no way be considered as an admission that such art is widely known or forms part of common general knowledge in the field.

Electric vehicles have been available for many decades and make use of one or more electric machines to provide locomotive drive for the vehicle. In more recent times this form of vehicle is becoming increasingly more viable as cars, vans, busses and trucks for private and commercial use. Electric vehicles offer many advantages over vehicles with an internal combustion engine (ICE) and hybrid ICE/electric motor vehicles. However, the major relative disadvantages or drawbacks of electric vehicles, in fact or in perception, remain as: the range that is available between recharging is relatively short; and the charging time, particularly to obtain a full charge, is long relative to the refueling time for a car with an ICE.

To encourage the sale and use of electric vehicles at least one electric vehicle manufacturer, as well as other non-manufacturers, are making efforts to have purpose-built rapid charging stations constructed in a number of different locations. This however remains a very expensive infrastructure-based solution that will take considerable time to meaningfully deploy.

The requirement for purpose-built charging stations and other infrastructure to reduce the duration of the recharging time for electric vehicles arises partly from the installation within such vehicles of recharging circuitry that is only capable of accommodating relatively low power levels. One factor contributing to the lack of dedicated high power recharging circuitry in the vehicles is to reduce the cost of manufacture of the vehicles. However, other design motivations are to reduce the weight and size of the vehicles. It will be appreciated that providing high power components on-board a vehicle, and the need to keep those components within acceptable operating temperature ranges, adds cost, consumes considerable space and adds considerable weight. This last factor greatly diminishes vehicle performance and range, which perpetuates the problem that is trying to be solved. Additionally, the weight of the dedicated recharging components carried by a vehicle can be considered dead weight, as it is traditionally only used when the vehicle is stationary and not operating.

One partial solution that has been proposed to this problem is to include in an electric vehicle a power conversion device that is a drive circuit for the electric machine and a charging circuit for the on-board battery. An example of such a power conversion device is disclosed in Chinese utility patent CN 203708127, where use is made of all three of the motor windings of a switched reluctance motor for charging the battery from an AC source. This prior art arrangement is however limited in operation and application. By way of example, it is limited to: an AC input for charging; and a switched reluctance motor. Moreover, it is not able to gain the benefits of scale, in that where use is made of multiple motors there is also a need to make use of multiple versions of the conversion device.

A further solution to this problem has been proposed by the present patent applicant, and is the subject matter of international patent application PCT/AU2016/050852, the content of which is incorporated herein by way of cross-reference. The architecture disclosed in this international application has wide application to electric vehicles. However, it has also further highlighted the disadvantages mentioned above that are inherent in conventional charging station methodologies.

Although it is possible for those vehicles having the architecture referred to in the preceding paragraph to be charged at conventional vehicle charge stations, it is not always possible to gain all the benefits of the onboard regulation that is offered by the new architecture. However, to realise those gains would likely require considerable replication of infrastructure at each charging station to accommodate more vehicle types. Moreover, as charging voltages, currents and cycles change with the development and deployment of new vehicles and technologies, this infrastructure overhead will only increase, and potentially prohibitively. Moreover, such an outcome will only further any range anxiety of consumers and hinder the uptake of electric vehicles.

Accordingly, there is a need in the art for an improved vehicle and an improved vehicle charging station.

SUMMARY OF THE INVENTION

It is an object of the present invention to overcome or ameliorate at least one of the disadvantages of the prior art, or to provide a useful alternative.

According to a first aspect of the invention there is provided A charging station for an electric vehicle, wherein the electric vehicle has a body, a first coupler mounted to the body, and a first communications module, and wherein the charging station includes:

a second coupler for releasably complementarily coupling with the first coupler for allowing a transfer of energy from the second coupler to the first coupler at a coupler voltage and a coupler current;

a second communications module for communicating first charging data with the first communications module;

an interface for connecting with an external source of electrical energy;

a control module for providing control signals; and a switching module that is responsive to the control signals for selectively:

connecting the second coupler and the interface for allowing the transfer of energy between the couplers; and operating in: a first mode to allow at least one of the coupler current and the coupler voltage to be regulated; or a second mode to allow the coupler current and the coupler voltage to be unregulated.

In an embodiment the station includes a DC energy storage device and the switching module is responsive to the control signals for selectively connecting the storage device with the second coupler for allowing the transfer of energy between the couplers.

In an embodiment the switching module is responsive to the control signals for selectively disconnecting the storage device from the second coupler.

In an embodiment the switching module is responsive to the control signals for selectively connecting the storage device with the interface for allowing transfer of energy between the storage device and the external source.

In an embodiment the energy storage device has a device current and a device voltage and the switching module is responsive to the control signals for operating in a third mode for connecting the interface and the storage device such that at least one of the device current or device voltage is regulated by the interface.

In an embodiment, in a mode of operation, the switching module is responsive to the control signals for operating in a fourth mode for connecting the interface and/or the storage device with the second coupler for allowing the coupler current to be drawn, at least in part, from at least one of the interface or the energy storage device.

In an embodiment the coupler voltage is directly derived from the device voltage.

In an embodiment the first charging data is indicative of whether the station is to operate in the first mode or the second mode.

In an embodiment the interface includes a regulator for transferring energy with the external source and for providing an output current and an output voltage to transfer energy with at least one of the storage device and the second coupler, wherein at least one of the output current or the output voltage is regulated.

In an embodiment one or more of the device voltage and device current is defined, at least in part, by the respective output voltage and the output current.

In an embodiment the switching module, in a fifth mode, is responsive to the control signals for selectively transferring energy between the storage device and the second coupler, wherein at least one of the coupler voltage and coupler current and the device voltage and device current is regulated by the interface.

In an embodiment one or more of the coupler voltage and coupler current is defined, at least in part, by the respective output voltage and the output current.

In an embodiment, when transferring energy to the external source, the output voltage and the output current is defined, at least in part, respectively by at least one of: the coupler voltage and the coupler current; and the device voltage and device current.

In an embodiment the coupler current is derived from at least one of the device current or the output current.

In an embodiment the interface includes a pair of interface terminals, the second couplers include a pair of coupler terminals wherein the interface terminals are directly connected to the second coupler terminals.

According to a second aspect of the invention there is provided a vehicle including:

a body;

a first DC energy storage device mounted to the body;

a first coupler mounted to the body for coupling with a second complementary coupler of a vehicle charging station to allow energy transfer to the first coupler, wherein the vehicle charging station includes a second DC energy storage device that provides to the second coupler an unregulated DC voltage;

an electric machine mounted to the body, wherein the machine draws a drive current from the first DC energy storage device for providing locomotive energy to the vehicle;

a first communications module, wherein the vehicle charging station includes a second communications module for communicating first charging data to the first module; and an onboard controller that is responsive to the first charging data for allowing, when the first and second couplers are coupled, a load current to be drawn from the second energy storage device, wherein the load current allows for the generation of at least one of a regulated charging current or a regulated charging voltage for the first DC energy storage device.

In an embodiment the coupling of the first and the second couplers allows energy transfer between the couplers.

In an embodiment the first coupler includes a first pair of terminals and the second coupler includes a second pair of terminals that are complementarily engagable with the first pair of terminals.

In an embodiment the first coupler and the second coupler include respective inductive transducers for allowing the energy transfer when in proximity to each other.

In an embodiment the vehicle charging station includes a local controller and the first communications module communicates second charging data to the second communications module, wherein the local controller is responsive to the second charging data for allowing or preventing the drawing of the load current.

In an embodiment the electric machine includes one or more windings and the onboard controller controls the machine such that the drive current excites at least one of the one or more windings.

In an embodiment the onboard controller controls the machine such that the load current excites at least one of the one or more windings.

In an embodiment the electric machine includes a plurality of electric machines.

In an embodiment the onboard controller controls all the machines.

In an embodiment each of the first and the second energy storage devices include one or more of: at least one battery; and at least one capacitive device.

In an embodiment the charging station includes an interface with an external source of electrical energy and the interface allows for charging of the second energy storage device from the external source while the load current is being drawn.

In an embodiment the onboard controller operates in a first state when the drive current from being drawn and a second state when the load current is being drawn.

In an embodiment the first state and the second state are temporally mutually exclusive.

In an embodiment the controller selectively switches between the first state and the second state to allow charging of the first energy storage device during motion of the vehicle.

In an embodiment the onboard controller is responsive to the first and second couplers being coupled for preventing the drive current from being drawn.

In an embodiment the onboard controller is responsive to the first and second couplers being coupled for allowing the load current to be drawn.

In an embodiment the first coupler is able to accept an AC voltage, a regulated DC voltage, or an unregulated DC voltage.

In an embodiment the vehicle includes a third coupler for coupling with a fourth coupler of a further energy source to allow energy to transfer to the third coupler.

In an embodiment the coupling of the third and fourth coupler allows for energy to be transferred between the couplers.

In an embodiment the further energy source is an AC source of electrical energy.

In an embodiment the vehicle includes an AC-DC converter for selectively generating, at least in part, one or more of the regulated charging current or the regulated charging voltage for the first DC energy storage device.

In an embodiment the vehicle includes a first drive circuit and a second drive circuit that operate in a first and a second state, wherein, in the first state, the first and second drive circuits draw current from the first DC energy storage device, and wherein, in the second state, the second drive circuit is electrically disconnected from the first DC energy source and the first and second drive circuits are responsive to the load current to generate the regulated charging current and/or the regulated charging voltage.

According to a third aspect of the invention there is provided a vehicle charging station for an electric vehicle, wherein the electric vehicle has a body, a first DC energy storage device mounted to the body, a first coupler mounted to the body, an electric machine mounted to the body that draws a drive current from the first DC energy storage device for providing locomotive energy to the vehicle, a first communications module and an onboard controller for controlling the drive current and providing at least one of a regulated charging current or a regulated charging voltage to the first DC energy storage device, and wherein the vehicle charging station includes:

a second coupler for being complementarily coupled with the first coupler for allowing transfer of energy to the first coupler; and a second communications module for communicating first charging data to the first communications module; and a second DC energy storage device that, after communication of the first charging data, provides to the second coupler an unregulated DC voltage such that, when the first and the second couplers are coupled, a load current is able to be drawn from the second DC energy storage device to thereby allow the onboard controller to generate at least one of the regulated charging current and the regulated charging voltage.

In an embodiment the second energy storage device includes one or more of: at least one battery; and at least one capacitive device.

In an embodiment the charging station includes an interface with an external source of electrical energy for allowing the second energy storage device to be charged from the external source.

In an embodiment the interface is bidirectional and allows the second energy storage device to be discharged to the external source.

In an embodiment the interface allows for charging of the second energy storage device from the external source while the load current is being drawn.

In an embodiment the external source is an electrical grid.

In an embodiment the first communications module communicates second charging data to the second communications module.

In an embodiment the vehicle charging station includes a station controller that is responsive to the second charging data for allowing one or more of: the load current to flow once the first and second couplers are electrically coupled; the availability of the second coupler to be electrically coupled to the first coupler; and defining a maximum allowable value for the load current.

In an embodiment the first and the second coupler include respective pairs of terminals.

In an embodiment the external source includes one or more intermittent power sources.

In an embodiment the interface includes a rectifier circuit.

In an embodiment the interface includes a bidirectional rectifier/inverter.

In an embodiment the interface includes a power factor correction circuit.

According to a fourth aspect of the invention there is provided a method of operating a vehicle charging station for an electric vehicle, wherein the electric vehicle has a body, a first DC energy storage device mounted to the body, a first coupler mounted to the body, an electric machine mounted to the body that draws a drive current from the first DC energy storage device for providing locomotive energy to the vehicle, a first communications module and an onboard controller for controlling the drive current and providing at least one of a regulated charging current or a regulated charging voltage to the first DC energy storage device, and wherein the method includes the steps of:

complementarily coupling the first coupler with a second coupler of the vehicle charging station for allowing energy to be transferred to the first coupler;

communicating first charging data from the station to the first communications module using a second communications module; and a second DC energy storage device that, after communication of the first charging data, provides to the second coupler an unregulated DC voltage such that, when the first and the second couplers are coupled, a load current is drawn from the second DC energy storage device and the energy transferred to the first coupler for use by the onboard controller to generate at least one of the regulated charging current and the regulated charging voltage.

According to a fifth aspect of the invention there is provided a vehicle including:

a body;

a DC energy source mounted to the body;

a connector mounted to the body for connecting with an external energy source;

an electric machine mounted to the body for providing locomotive energy to the vehicle, wherein the or each machine has a stator, a rotor mounted to the stator for rotation, and one or more windings; and a controller for operating in a first state and a second state wherein, in the first state, the controller allows current to be drawn from the DC energy source for energising at least one of the one or more windings such that the electric machine provides the locomotive energy and, in the second state, the controller controls the position of the rotor relative to the stator and allows at least one of the one or more windings to be energised to provide a charging current to the DC energy source.

In an embodiment the controller, in the second state, actuates a locking unit to restrain the rotor against rotation relative to the stator.

In an embodiment the locking unit includes at least one of the one or more windings.

In an embodiment the vehicle includes a further electric machine having one or more windings, wherein the locking unit includes at least one of the one or more windings of the further electric machine.

In an embodiment the locking unit mechanically locks the rotor against rotation.

In an embodiment the locking unit includes a parking pawl.

In an embodiment the locking unit includes a handbrake.

In an embodiment the vehicle includes a decoupling unit for selectively decoupling the electric machine from the locking unit.

In an embodiment the vehicle includes at least one wheel that is driven when the electric machine provides locomotive energy to the vehicle, wherein the decoupling unit selectively decouples the electric machine from the at least one wheel.

In an embodiment the decoupling unit includes a clutch.

In an embodiment the controller progresses between the first and second state to control the position of the rotor relative to the stator.

In an embodiment the electric machine includes a plurality of magnetic poles and the parking pawl is aligned with the poles.

In an embodiment the controller is responsive to movement of the vehicle for controlling the position of the rotor relative to the stator.

In an embodiment the electric machine includes a plurality of magnetic poles and the controller, in the second state, controls the position of the rotor to align with the magnetic poles.

In an embodiment the electric machine includes a plurality of magnetic poles and the controller, when transitioning from the first state to the second state, controls the position of the rotor to align with the magnetic poles.

In an embodiment the vehicle includes at least two electric machines and wherein the controller controls, during the second state, one of the at least two electric machines to substantially or wholly counteract the torque of the other of the at least two electric machines.

In an embodiment the controller controls, during the second state, the position of the rotor of one of the at least two electric machines by energising at least one of the one or more windings of the other of the at least two electric machines.

In an embodiment the electric machine has two or more sets of windings and the controller, in the second state, energises at least one of the two or more sets of the windings selectively to substantially or wholly counteract torque generated by the other of the two or more sets of windings.

In an embodiment the vehicle includes drive circuits for the respective two or more sets of windings, wherein the controller operates: the drive circuits of one of the two or more sets of windings in the first state to control the rotor position; and the other drive circuits in the second state to control the rotor position.

In an embodiment the electric machine includes a plurality of electric machines.

In an embodiment the controller, during the second state, continuously controls the position of the rotor relative to the stator.

Reference throughout this specification to "one embodiment", "some embodiments" "an embodiment", "an arrangement", "one arrangement" means that a particular feature, structure or characteristic described in connection with the embodiment or arrangement is included in at least one embodiment or arrangement of the present invention. Thus, appearances of the phrases "in one embodiment", "in some embodiments", "in an embodiment", "in one arrangement", or "in and arrangement" in various places throughout this specification are not necessarily all referring to the same embodiment or arrangement, but may. Furthermore, the particular features, structures or characteristics may be combined in any suitable manner, as would be apparent to one of ordinary skill in the art from this disclosure, in one or more embodiments or arrangements.

As used herein, and unless otherwise specified, the use of the ordinal adjectives "first", "second", "third", etc., to describe a common object, merely indicate that different instances of objects in a given class of objects are being referred to, and are not intended to imply by their mere use that the objects so described must be in a given sequence, either temporally, spatially, in ranking, in importance or in any other manner.

Unless defined otherwise, all technical and scientific terms used herein have the same meaning as commonly understood by those of ordinary skill in the art to which the invention belongs. The articles "a" and "an" are used herein to refer to one or to more than one (that is, to at least one) of the grammatical object of the article unless the context requires otherwise. By way of example, "an element" normally refers to one element or more than one element. As used herein, the term "exemplary" is used in the sense of providing examples, as opposed to indicating quality. That is, an "exemplary embodiment" is an embodiment provided as an example, as opposed to necessarily being an embodiment of exemplary quality.

The term "electric machine" is used in a broad sense to include electric motors, generators and other electromechanical devices that convert electrical energy into mechanical energy, or vice versa, or both. For convenience, and unless is otherwise clear from the context, the terms "electric motor" or "motor" are used as an equivalent for, and interchangeably with, the terms "electric machine" or "machine".

Reference in this specification to the term "vehicle" includes a reference to both land-based vehicles and other vehicles such as aircraft and watercraft. Typical examples of land-based vehicles include plug-in electric vehicles and plug-in hybrid electric vehicles. These electric vehicles and hybrid electric vehicles are not limited to cars, and include also trucks, buses, forklifts, scooters, electric bicycles, motorcycles and other personal transportation devices, buggies (such as golf carts and the like), mining equipment, agricultural equipment, recreational vehicles, and others.

BRIEF DESCRIPTION OF THE DRAWINGS

Embodiments of the invention will now be described, by way of example only, with reference to the accompanying drawings in which.

DETAILED DESCRIPTION

Described herein is an electric vehicle and a charging station for such an electric vehicle.

This patent application claims the benefit of Australian patent application 2017901696 filed 8 May 2017 and Australian patent application 2017902796 filed 17 Jul. 2018, the contents of which are incorporated herein by way of cross-reference. Also incorporated herein by way of cross reference is the contents of an international patent application PCT/AU2018/000065 filed 8 May 2018.

Figure 1:
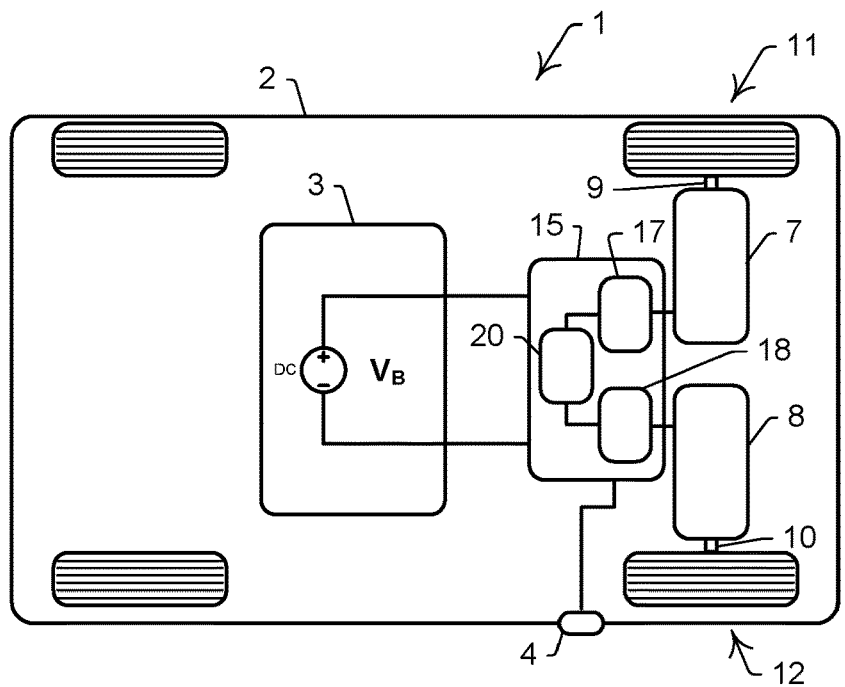
FIG. 1 is a schematic top view of an electric vehicle according to an embodiment of the invention and an associated charging station.

Referring to FIG. 1 there is illustrated schematically a vehicle, in the form of an electric passenger car 1. The car includes a body 2 and a DC energy source, in the form of a battery pack 3, mounted to body 2 for operating at a source DC voltage $V_B$. A charging port 4 is mounted to body 2 for connecting selectively with an external energy source, which in this instance is an electric vehicle charging station 5 that operates at an external voltage $V_C$. In this embodiment, charging station 5 is able to act in different modes to output either a regulated or unregulated DC voltage. In modes where station 5 outputs a regulated DC voltage, charging station 5 is responsible for supplying to car 1 either a regulated charging current or a regulated charging voltage. In modes where station 5 outputs an unregulated DC voltage, car 1 must draw current from station 5 and regulate a DC charging current and/or voltage onboard. In this embodiment, the unregulated DC voltage supplied by station 5 is related to the floating voltage of an integrated DC storage device (not shown). Two electric machines—being like three phase induction machines 7 and 8 respectively—are mounted to body 2 for providing locomotive energy to car 1 by selectively rotating respective shafts 9 and 10 that are directly connected with respective rear wheels 11 and 12 of car 1. It will be appreciated that machines 7 and 8 each have three inductive windings (not shown in FIG. 1), which will be described in more detail below. Car 1 also includes a controller 15 for interlinking pack 3, machines 7 and 8 and station 5. In particular, controller 15 includes for machines 7 and 8 a separate respective controller 17 and 18. In this embodiment, controller 15 is able to regulate a DC charging current and/or voltage to charge its onboard battery pack 3 from station 5, when station 5 is operating in a mode where it supplies an external unregulated DC voltage source. In this embodiment, controllers 17 and 18 are each constituted, for example, by the controller 61 that is disclosed in FIG. 2 of Australian provisional patent application 2015903706 which was filed with the Australian Patent Office on 11 Sep. 2015 (the Earlier application) and which is the basis for a later filed international application PCT/AU2016/050852. While FIG. 2 in the Earlier Application illustrates controller 61 with "a 3-phase motor or pump", it is described further in paragraphs [0077] to [0079] of the Earlier Application as being applied to electric vehicles. The full disclosure of controller 61 in the Earlier Application, including its structure, function and advantages, is incorporated herein by way of cross reference. For ease of cross-reference, the following concordance table is provided for equivalent features.

| The Earlier Application | The present embodiment |
| --- | --- |
| Controller 1 | Controller 17 (or Controller 18) |
| Pack 8 | Pack 3 |
| Source 15 | Station 5 |
| Motor 62 | Machine 7 (or Machine 8) |
| Switch 48 | Switch 48 |
| Switch 182 | Switch 182 |
| Capacitor 65 | Capacitor 65 |
| Input Circuit 75 | Input Circuit 75 |
| Electrical grid 77 | Electrical grid 77 |
| Input Terminals 76 | Input Terminals 76 |
| Module 20 | Module 20 |

In other embodiments of the invention an electric vehicle includes, in addition to or instead of controllers 17 and 18, other controllers that are configured similarly to another of the controllers disclosed in the Earlier Application.

While the following description makes reference to a controller for a vehicle such as car 1, it will be appreciated that other embodiments are applicable to other vehicles with one or more electric machines that are open to the system of control that is described herein. Such vehicles include trucks, vans, buses, quad-bikes, buggies motorcycles (and other two or three wheeled conveyances), autonomous vehicles, and the like. Similarly, other vehicles are embodied as watercraft or aircraft, where the latter includes manned and unmanned aircraft (such as drones).

Figure 2:
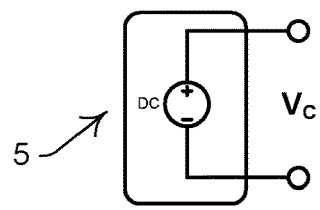
FIG. 2 is an electrical schematic diagram of a controller for a three phase induction machine having a wye configuration and which is configured to receive DC power from an external DC source.
Figure 2:
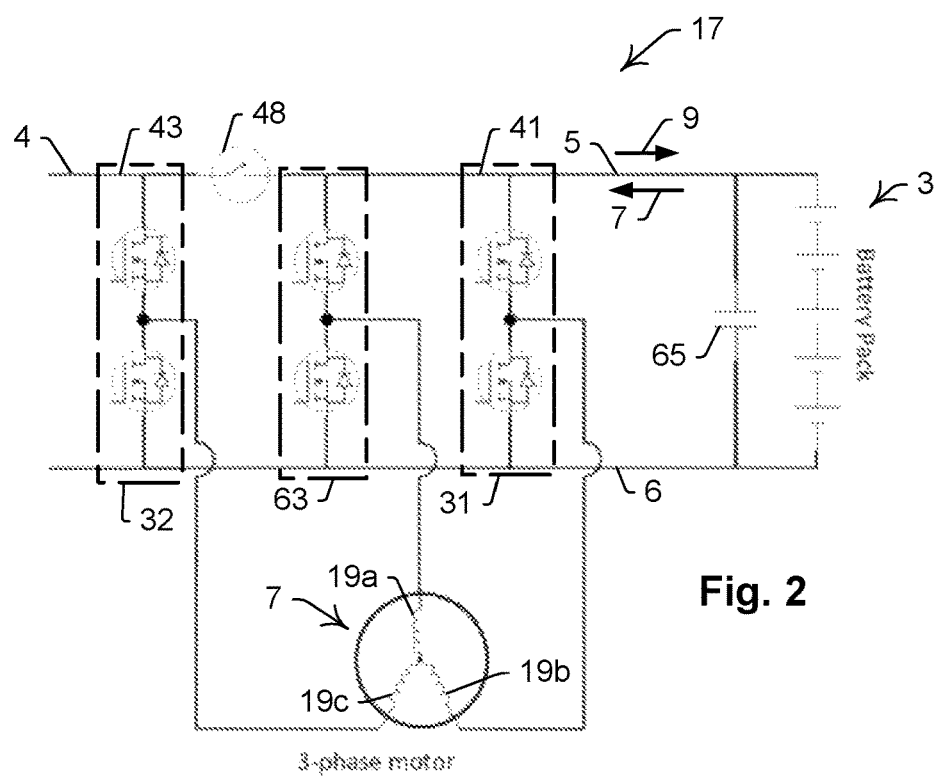

For the sake of completeness, controller 17 is shown schematically in FIG. 2. Controller 17 is for an electric machine in the form of a three-phase motor 7 having three windings 19a, 19b and 19c that are connected in a wye configuration. In other embodiments a delta configuration is used. Controller 17 includes three drive circuits, including circuit 31, circuit 32 and circuit 63. Switch 48 operates, in response to relevant control signals from a module 20 (shown in FIG. 1, but omitted from FIG. 2 for the purposes of clarity) to selectively disconnect power rails 41 and 43. In addition, module 20 generates further control signals for circuits 31, 32 and 63, to allow for the required energy flows during the different states of operation. This selective disconnection of the power rails and the resultant energy flows in the different states of operation allow controller 17 to act as a bidirectional DC-to-DC converter. This in turn, allows for:

Current being supplied to motor 7 from current drawn from pack 3 to provide rotation of shaft 9 (in either direction) and hence drive for car 1.

Current being supplied to motor 7 by a DC source connected to port 4. (This could be, for example, a supplementary energy supply (not shown) that is being carried temporarily or otherwise by car 1. The supplementary energy supply is able to be a supplementary energy storage device having one or more or a combination of ultracapacitors, capacitors, batteries and hybrid devices, or a supplementary energy generation device such as a PV array or fuel cell).

Charging current being provided to pack 3 from port 4.

Current being drawn from pack 3 and transferred, via port 4, to an electrical load or other electrical sink of either DC or AC nature.

The generation of current from motor 17 during braking of car 1 to supply to pack 3 (or any supplemental energy storage device) as charging current. That is, the implementation of regenerative braking.

The generation of current from motor 17 during braking of car 1 to supply any DC source or load connected to port 4.

In other embodiments, switch 48 is disposed between drive circuits 63 and 31, and the positive power rail of drive circuit 63 is connected to power tail 43.

In further embodiments, switch 48 is disposed between controllers 17 and 18 and the motor phases of motors 7 and 8 are interconnected between the controllers. That is, one or more of the drive circuits of motor 7 are contained within controller 17 and one or more of the drive circuits within controller 18.

In still further embodiments, motor 7 is other than a 3-phase motor. Examples of such embodiments have motor 7 substituted with an inductive load, including a transformer or other winding or windings.

These and other functions available from controller 17 and 18 are provided in further detail in the Earlier Application. The entire disclosure of the Earlier Application is included herein by way of cross-reference.

It will also be appreciated that module 20 coordinates controllers 17 and 18 to act in combination to provide the drive to wheels 11 and 12. This includes having wheels 11 and 12 being driven to rotate at substantially the same angular velocity and in the same direction, at different angular velocities, or even in different directions, depending upon the detected drive conditions and nature of the drive required.

In the embodiment shown in FIG. 2, Drive circuits 31 and 63 include common DC power rail 41 from which DC current is selectively drawn by the respective drive circuits to energise at least one of the one or more windings 19a, 19b and 19c.

In this embodiment, switch 48 is a specific switching device that operates in a first state and a second state wherein, in the first state, switch 48 allows power rails 41 and 43 to draw energy from pack 3 (for motoring and regeneration) and, in the second state, the switch 48 isolates power rail 41 from power rail 43 to allow power rail 41 to operate at a first DC voltage that is related to $V_B$ and power rails 43 to operate at a second DC voltage that is related to $V_C$. In this embodiment, when operating in the second state, pack 3 is able to be charged from station 5 (which is referred to as a charging mode), or pack 3 is able to supply energy to station 5 (which is referred to as a charging or vehicle-to-X [V2X] mode).

In this embodiment the first voltage is $V_B$ and the second voltage is $V_C$. However, in other embodiments, for example, station 5 provides an AC voltage and there is a rectifier and/or inverter and/or filter circuit (not shown) between port 4 and rail 43 for generating the second voltage from $V_C$ or $V_B$.

In the FIG. 1 embodiment the DC source voltage $V_B$ is 200 Volts DC. However, in other embodiments use is made of different voltages, or varying DC voltages. As will be appreciated by a skilled addressee, many different voltages are presently in use for electric vehicles, ranging typically from about 48 Volts to many hundreds of Volts. Moreover, while use is made in the embodiment of three phase induction motors, in other embodiments, different electric machines or motors are used. Moreover, in other embodiments controller 15 is configured accordingly to allow the relevant functionality to be provided with that form of electric machine.

In other embodiments a different number of electric machines are used in the electric vehicle, spanning from one machine to many machines. Moreover, while the FIG. 1 embodiment includes only two driven wheels, which are driven independently, in other embodiments a different subset, or all of the wheels, are driven either independently or dependently, or a combination of these options.

In other embodiments, different electric machine types, and/or machines with different number of phases, and/or machine winding configurations, are used for the motoring and charging process. In embodiments with more than one phase, where each phase is controlled by a drive circuit, multiple current paths exist by allowing or disallowing current through the individual phases. This method of operation alters the inductance and resistance path of the current, for instance, by placing some of the phases in series or parallel. In this way, the characteristics of the second mode of operation (that is, charging cycle) is able to be manipulated to alter or improve the charging efficiency, noise, harmonic distortion, power factor, or the like. In some embodiments, increasing the number of phases in the electric machine increases the versatility of characteristics in the second mode of operation. In further embodiments, multiple independent connections of phase windings are present within the same machine. An example of such a machine includes two independent sets of 3-phase star or delta connected windings within the stator of a machine to form machine with six driveable phases. In still further embodiments, other machine types and winding configurations are utilised to achieve variable charging and motoring characteristics.

In some embodiments, generating motor torque in the electric machine during the second state is undesirable and yet unavoidable. In some embodiments the need to reduce or mitigate this unwanted torque is accommodated. This is especially apparent in a permanent magnet type machine where a permanent magnetic field exists, whereby applying an electric current to a motor phase will generate an electromagnetic field due to the structure and nature of the machine. In such embodiments, a DC charging current flowing through one or more of the windings typically produces a magnetic alignment torque in the machine should the permanent field and electromagnetic field not already be aligned. In some embodiments, to mitigate a build-up of this alignment torque—particularly for those machines which are prevented from self-aligning—some or all of the machine's phases are pulsed alternatively to create competing alignment torque between two different poles. This creates a time averaged torque that is close to or equal to null. In other embodiments, for example, there are multiple independent stator phase windings in a single rotor machine, or different machines that have rotors that are linked together. In these embodiments each independent phase winding is able to operate such that the induced torque imposed by those windings on the rotor at any given time is counteracting to substantially or fully cancel each other out. In some embodiments, such as those in which the machine rotor is not locked in the second mode, the alignment torque is allowed to be generated, and the motor allowed to self-align, after which no further alignment torque will be generated.

In other embodiments, the electric machine used is a salient machine, presenting different phase characteristics based on rotor position. In one such embodiment, controller 17 uses the saliency of a machine advantageously during the second state. In one embodiment, self and mutual inductance vary with rotor position, and as such, the rotor position is able to be used to fine tune the charging cycle in the second state for outcomes such as efficiency, THD, EMI, torque properties, switching frequency, and/or duty cycle, or the like. Through torque generation in the rotor, or external automated or manual physical rotor adjustment, controller 17 is able to rotate the rotor of the machine during the second state (charging cycle), to vary the phase characteristics and other properties of the charging cycle, in real time and based on feedback and/or pre-programmed conditions. In other embodiments, controller 17 enters the first state of operation to manipulate rotor position for the purpose of improving the characteristics of the second state of operation.

Figure 10:
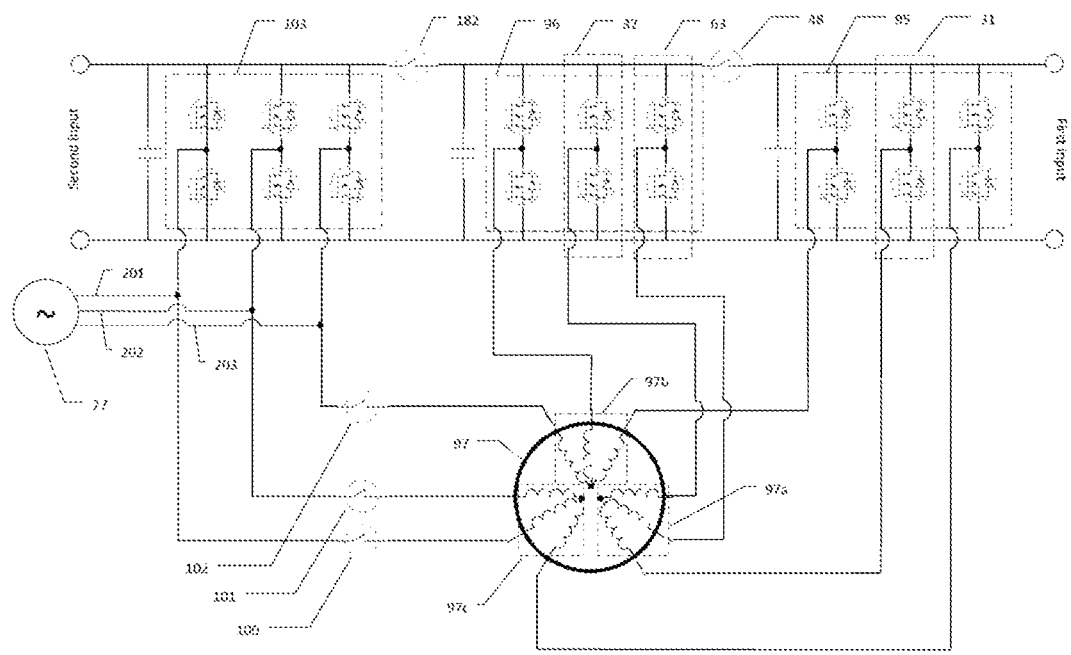
FIG. 10 is a schematic representation of a controller for a further electric vehicle having multiple drive circuits, where some drive circuits are used for rectification

In some embodiments, for safety, efficiency, or other optimisation, the machine rotor and stator are physically locked or otherwise restrained during the second state of operation. This locking or restraint against relative movement is implemented with a locking unit that, in different embodiments, is implemented in one or combination of ways. In some embodiments the locking unit includes a mechanical lock or braking device, while in other embodiments the locking unit includes one or more of the windings of the electric machine, or an additional electric machine. Examples of mechanical locking units include a parking pawl, a park brake, a clutch, or other mechanical means used either alone or in combination. However, other locking units are primarily electrical or electromechanical in operation. In some embodiments, a mechanical lock is used, such as a parking brake that is applied whilst the vehicle is stationary. This includes, for example, a brake that is applied to the wheels of the vehicle to therefore lock in position any direct drive motor due to its mechanical linkage to the braked wheels. This parking brake is able to be used in conjunction with another mechanism, such as a clutch, to also allow the machine rotor to rotate whilst keeping the vehicle stationary. Many hybrid electric vehicles already employ clutch mechanisms to disengage the electric machine from the internal combustion engine and/or wheels, and this clutch system is able to be used as the mechanism to manipulate and lock rotor position. In embodiments with a locking device or mechanism, the machine rotor or stator is able to be locked exactly—in a practical sense—to a beneficial alignment position. For example, in some embodiments, the machine rotor is locked in alignment to any magnetic pole of the machine. This is able to be achieved, for example, by locking a parking pawl into a gear or cog with teeth complementarily aligned with the machine poles. FIG. 10 illustrates one such embodiment where a pawl 113 locks in to a toothed gear 112 which is aligned with the magnetic poles of the machine stator 110. In this way, when the controller enters the second state/charging mode, no alignment torque will be generated. In this embodiment of a 4-pole 6-slot synchronous machine, gear 112 contains 12 teeth, each 30° apart, and locked in alignment with a rotor pole, such that each available locking slot for pawl 112 correlates a rotor pole with an electrical pole of the stator. In other embodiments, the machine rotor is locked in a position in between poles, depending on the saliency of the machine, or other machine properties, to achieve a desirable charging characteristic. In some embodiments, the locking mechanism has multiple locking positions, such as in alignment or misalignment with a pole, such that the rotor is able to be selectively locked in any one of a number of positions. In further embodiments making use of parking pawl 113 and gear 112, gear 112 contains other than 12 teeth, and/or teeth spaced other than 30 degrees apart. In some embodiments, the mechanical lock is able to engage (that is, to lock) and disengage (that is, to unlock) the machine rotor on command, such as through an electromechanical clutch with a locked park brake, a parking pawl mechanism, or the like. In one such embodiment, controller 17 also sends command signals to the mechanical locking mechanism such that the machine locks and unlocks during the charging process to achieve a variety of stationary and dynamic characteristics during the charging program. For example, this is able to include manipulating the rotor position during the unlocked periods, and re-locking it into new positions, when advantageous to do so. In some embodiments, to simplify the design of the locking system or mechanism, controller 17 is programmed to stop the motor in a beneficial alignment position at the end of each first state of operation (motoring) cycle, ready for easy locking by the mechanical locking mechanism in the desired alignment in preparation for the second state. In one such embodiment, this alignment is achieved by using a rotor position feedback device such as a Hall effect sensor or encoder. This is exemplified in FIG. 10 where Hall effect sensors 109a, 109b, and 109c provide the rotor position feedback required to easily engage pawl 113 in the correct position locking position of gear 112. In such an example, gear 112 contains many teeth to enable a variety of locking positions. In other such embodiments, this alignment is achieved by injecting a DC current, similar to that used in the second state, into the machine as the rotor approaches a zero rotational velocity at the completion of operation in the first state. In further embodiments utilising one or more machines with multiple independent sets of windings, one or more windings are used to generate torque to lock or manipulate the rotor position, while another one or more sets of windings regulate the charging current. In still further embodiments utilising one or more machines with multiple independent sets of windings, or multiple machines with linked rotors, the current through each set of windings is able to be mirrored such that any rotor torque created by one winding will be cancelled out substantially or entirely by the other winding or windings.

In further embodiments the locking unit use is made of both a mechanical locking device and selective energisation of one or more of the motor coils by controller 17.

Figure 11:
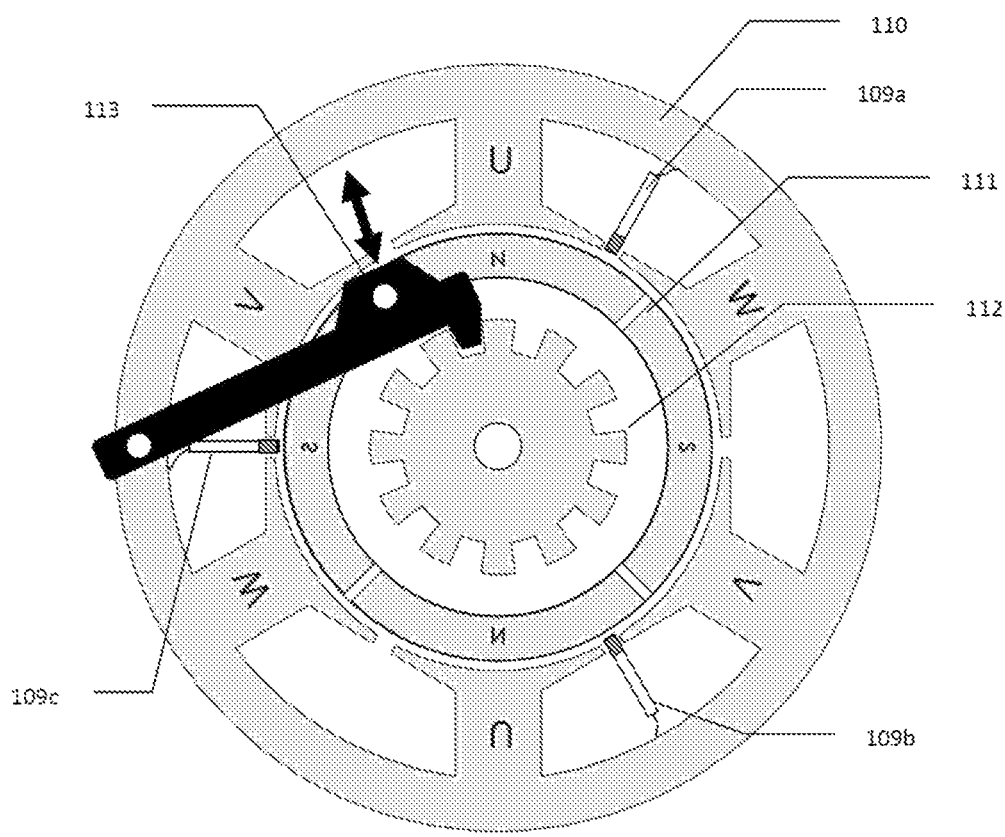
FIG. 11 is a cross sectional view of a locking unit, in the form of a parking pawl, used in an embodiment.

Reference is now made to FIG. 11 which illustrates an embodiment of car 1 with two electrical machines 7 and 8. The machines are cooperatively connected in series and separated by an intermediate clutch. In this embodiment, there are two locking mechanisms, one for each machine. Machine 7 includes a locking mechanism in the form of pawl 113. Two brakes 115 are controlled by the vehicle control unit (not shown) or controller 17 (not shown) or another controller, to selectively slow car 1 during use, provide park brake functionality, and/or to lock machine 8 in a desirable position. In one mode of operation, machine 7 operates in the second state with a clutch 114 decoupling the machine from the rest of the driveline used in car 1. In this way, machine 7 is able to operate at any speed, independently of the speed of the vehicle. For those times when machine 7 is decoupled from the driveline, machine 8 is able to provide propulsion to the vehicle, as required. Pawl 113 is able to lock machine 7 such that the rotor of machine 7 is maintained in any advantageous rotational position. For those times when machine 7 operates in the second mode, clutch 114 and machine 8 are able to be used to advantageously manipulate the rotational position of the rotor of machine 7. In another mode of operation, machine 7 and machine 8 operate in the second state, and any torque generated by one machine is opposed by the other due to either control of electrical currents in the machines or the position of rotor. Due to the operation of clutch 114, the rotors of machines 7 and 8 are able to be locked in complementary positions to improve the overall charging cycle for car 1. In other modes of operation, only machine 7, or only machine 8 is available to operate in the second state, or each machine is used intermittently in the second state. In other embodiments, another clutch is employed between machine 8 and the driven wheels. In further embodiments, machine 7 or machine 8 is eliminated from the vehicle. In still further embodiments, pawl 113 or clutch 114, or brake 115, or machine 7, or machine 8, is eliminated from the vehicle, or any combination thereof.

In still further embodiments, machine 7 is responsible for providing tractive effort to another driven axle, and machine 7 and machine 8 are able to act independently or dependently in a range of operational modes of the first and second state. In such embodiments, the rotor positions are linked via the vehicle's wheels' contact patch with the ground. In some embodiments, each of machine 7 and/or machine 8 includes a dedicated clutch 114 and/or dedicated pawl 113. In further embodiments, machine 7 and/or machine 8 are coupled, although not directly coupled, through the use of a driveline with specified torsional compliance, or other mechanisms for providing a degree of rotational delay or slip between the rotors of the machines or between the rotor and wheel. That is, the driveline between machines, or between a machine and the wheels, is designed to accommodate at least some twist or slip in response to torque before the output shaft will turn. In this way, the absence of a strict or direct relationship between the input and output shaft angle is achieved. In this way, machine 7 and/or machine 8 is able to align with its magnetic poles against a mechanical lock without causing car 1 to move or need to draw additional alignment current. In some embodiments, the coupling is very close to direct coupling as the maximum required slip or twist to achieve the desired alignment is minimal and the driveline able to be designed to absorb this angular anomaly without causing significant negative effect to the usual dynamic response of the driveline. For example, torsional compliance is able to be achieved through a driveline with a low torsional stiffness, whereas slip is able to be achieved through the use of a fluid coupler such as a torque converter. A lockup clutch is able to be employed to eliminate the variance in coupling during other operation. In other embodiments, flex in the wall of any tyre or tyres is able to be used to provide torsional compliance where the main park brake or pawl is located on an axle other than the axle coupled to machine 7 or machine 8.

In other embodiments, the controller electrically locks the rotor using an algorithm controlling the position and/or torque of the machine. In one particular embodiment, this includes controller 17, when in the second state of operation, briefly toggling to the first state of operation, and then back again, by pulsing switch 48. In some embodiments, car 1 is a two or three wheeled vehicle, such as an electric scooter, motorcycle, or tricycle, where the driving wheel of the vehicle is lifted from the ground by a stand whilst in the second state and charging. In this case, the motor is free to rotate to any desirable position, or self-align, or to be locked in to any position, during the charging process.

In some embodiments, the second state of operation (charging) is able to occur whilst the vehicle is moving, such as through dynamic wireless charging. In one such embodiment, the motor is able to continue to rotate with the drive-train of the vehicle, with controller 17 manipulating the charging current such that it does not generate significant torque to alter the vehicles natural speed. In further embodiments, any torque generated during the charging cycle is beneficial to vehicle dynamic operation to accelerate, decelerate or maintain a constant vehicle velocity. In some embodiments utilising an electric machine, this method need not achieve a continuous DC charging current. In further embodiments, a clutch or other method is employed to disconnect the machine from the drive-train whilst the vehicle is moving. In such embodiments, the motor is able to cease to rotate, or rotate at any speed independent of the vehicle, to achieve the charging process. In this case, the second mode of operation (charging cycle) occurs similarly to any stationary operational method, with the exception that controller 17 makes use of the clutch and the inertia of the vehicle as an external means to manipulate the rotor position to a desirable position or rotational velocity, or to apply a counter torque to any torque generated by the charging cycle. In some embodiments, controller 17 pulses switch 48 to swap between the first and second states of operation whilst the vehicle is moving. In further embodiments, energy received by the vehicle is stored in an ultra-capacitor (or other energy storage device) until controller 17 is able to transfer the energy into pack 3.

One of the functions of controller 17 is to facilitate charging of pack 3 from station 5. This is done by having the switching device (exemplarily illustrated as switch 48) in the second state, and controlling circuits 31, 32 and 63 in response to $V_C$ for allowing selectively a transfer of energy from station 5 to pack 3 via power rails 41 and 43. This function is described in more detail in the Earlier Application. It will be appreciated that, for more rapid charging of pack 3, both controllers 17 and 18 operate in parallel so that at least one winding in each motor 7 and 8 are used as part of the current path for charging current for pack 3.

Figure 13:
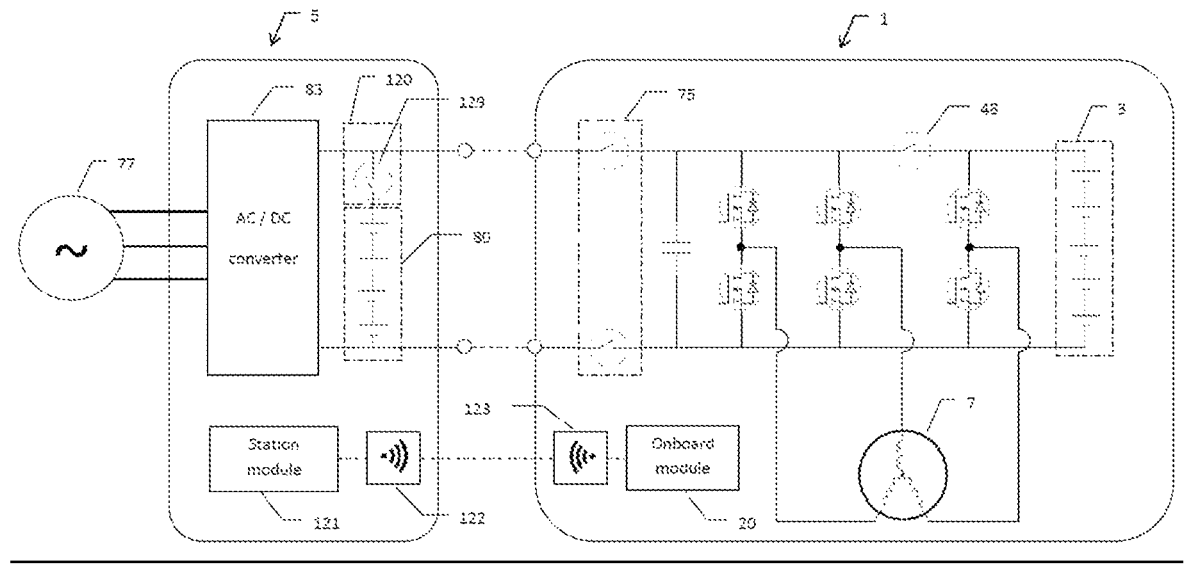
FIG. 13 is a schematic representation of an electric vehicle charging station coupled to an electric vehicle.

In an embodiment, car 1 includes an interlocking system to ensure that switch 48 opens (that is, electrically disconnects to provide an open circuit) when an external power source is connected to port 4. This automatic disconnection ensures that no potentially damaging surge or other current is transferred unabated from port 4 to pack 3 upon connection. In one embodiment in which switch 48 is a normally open (NO) switch type, the interlocking system is able to be achieved by placing a normally closed (NC) switch, such as a contactor or relay, in the circuit in series between the signal/control line of controller 17 and switch 48. The coil of this NC switch is routed through port 4 such that when a plug is complementarily received in port 4, the relay coil circuit is closed, forcing the relay to open and thereby disabling the control line to switch 48. In this way, when a plug is received in port 4, switch 48 is forced into an open state, and no current flows between the external source and pack 3 unless controller 17 manages this flow of energy through use of the drive circuits 31, 32, and/or 63. Similarly, when car 1 is in motion, an interlocking system is able to operate to ensure that switch 48 (or switch 182, described in more detail below) is not able to open and disrupt the operation of car 1. In most embodiments, safety mechanisms, such as fuses and/or disconnection contactors, are included in the input circuit 75 (as schematically illustrated in FIG. 13), or other circuit within or close to pack 3, and/or at port 4. In further embodiments, interlock systems and/or other functionalities on car 1 are controlled either in part or entirely by station 5.

In one embodiment, in the event of an emergency shutdown procedure initiating whilst car 1 is in motion, controller 17 opens switch 48 and/or switch 182. In some embodiments, such as those using certain permanent magnet machine types, this has the advantage of reducing the torque generated from the electric machine during the emergency shutdown. In other embodiments, switch 48 and switch 182 are kept in a closed state during an emergency shutdown procedure.

In some embodiments, car 1 includes an isolation monitoring device to monitor the isolation barrier between the low voltage circuit or chassis, and the high voltage circuit of pack 3. In the event of a detected breach of isolation between the low voltage (LV) circuit or chassis, and the high voltage (HV) circuit, controller 17 enters a safety state. In most embodiments, port 4 includes an earth pin which is tied to the chassis. In one such embodiment, station 5 includes an earth leakage detection circuit which detects if there is an earth leakage above a predetermined threshold and, if so, isolates the vehicle from the power source of station 5. In some embodiments, earth leakage monitoring information is communicated between car 1 and station 5 as part of first charging data or second charging data, which is described further below. In further embodiments, car 1 includes a ground fault detection circuit which isolates the vehicle from the charging station 5 in the event of direct currents, or non-sinusoidal currents which could otherwise affect the operation of a residual current device (RCD). This function is known as ground fault interrupt (GFI) in North America. In other embodiments, station 5 includes an RCD or RCMU capable of detecting and isolating DC voltages, greater than 20 kHz AC, and non-sinusoidal ground fault currents. The communication of this information between the car and the station is described further below. In the preferred embodiment of car 1, care is taken to maintain a strict isolation barrier, as well as limit any capacitive coupling, between the HV circuit and the chassis. This isolation barrier may include the use of reinforced isolation.

In one embodiment, car 1 includes multiple ports similar to port 4 such that multiple plugs are able to be simultaneously connected to car 1. In this way, current supplied to car 1 is able to be increased above the current carrying rating of a single plug.

In one embodiment, as exemplified in the FIG. 13, car 1 includes a system for communicating, or a circuit to sense or determine, one or more characteristics and/or capabilities of the external energy source. The system also communicates one or more characteristics and/or capabilities associated with car 1. Similarly, station 5 includes a system for communicating, or a circuit to sense or determine, one or more characteristics and/or capabilities associated with charging the vehicle that is connected to, or which is to be connected to, station 5. These characteristics and capabilities are able to include, for example, voltage, voltage type (for example, regulated DC, unregulated DC, or single or 3-phase AC), maximum permissible sink current, maximum permissible source current, state of charge (SoC) of energy source, state of charge (SoC) and/or status of a supplementary power source, required direction of power flow, etc. In the preferred embodiments, some or all of these characteristics are communicated as first charging data to or from the charging station.

In other embodiments, the communication of characteristics and/or capabilities is primarily one way, whereas in other embodiments it is two-way.

For conventional DC electric vehicle charging stations the available voltage $V_C$ is typically tightly regulated by the charging station to provide a requested charging current profile. The car 1 will typically, therefore, communicate the requested charging profile and battery state information to the external charging station via a communications protocol used by the charging station 5. There currently exists multiple competing communication protocols (some proprietary) which limit interoperability between vehicles and charging stations. It will also be appreciated that the voltage $V_B$ of the vehicle's onboard battery pack will vary considerably depending upon the nature and configuration of pack 3, and the state of charge of the batteries within pack 3. To accommodate the different voltage and charging profiles of multiple vehicle types and their respective battery pack 3, station 5 must include power electronics to regulate a wide variety of charging voltages and currents. In many cases, these power electronics are rated for high power (mostly, in excess of 50 kW) to provide a fast charge to car 1. However, this significantly increases the size, cooling requirements, and cost of the external charger used in station 5. Further to that, the communication standards and electronics within DC charging station 5 are typically fully integrated with the electrical hardware, fixed at the time of manufacture, and designed to charge vehicles currently available that make use of known technologies such as known battery chemistries. These DC charging stations are therefore not future-proof, and are prone to stifle innovation and development of vehicles in the future while also maintaining backwards compatibility. These issues are exacerbated by the fact that such charging stations are typically expensive infrastructure items to build and commission. Comparatively, controller 17 is designed for the exact requirements (for example, voltage and current capability) of car 1, and is designed in the same future era as the vehicle, and is therefore effectively future-proof.

It is known that consumers favour electric vehicles with longer ranges and faster charge times, and these factors are therefore a requirement for mass market adoption of these vehicles. Moreover, recent significant reductions in battery costs have enabled a new generation of electric vehicles to emerge with extended ranges, which is achieved due to a significant increase in the available energy storage onboard each vehicle. While this may have ameliorated the range concerns of electric vehicles, this extra onboard energy storage takes longer to fully charge. Accordingly, to alleviate the faster charge time requirements, there is a need for a greatly increased power transfer to the onboard storage. In an attempt to address this need for higher power charge rates, vehicle manufacturers have moved to higher voltages to be able to transfer the power required between the infrastructure (that is, the charging station) and the vehicle. This solution also has the benefit of being much more efficient as power loss in transmission is exponential to current transfer. Even so, the recent increase in voltage for Generation 3 vehicles (referred to as "Gen3 vehicles") is beyond the 500 Volt maximum limit of previously installed DC infrastructure. Therefore, all Gen3 vehicles and above will require an onboard means for charging from infrastructure that has been installed for charging Gen1 or Gen2 vehicles, or the existing infrastructure will have to be updated over time, at anticipated great expense, to accommodate both the original voltages for the earlier generation cars and the greater voltages for the later generation cars. For a later generation car to work with an earlier generation station will also require the onboard controller to accommodate different relative voltage levels of $V_B$ (or the related first voltage) and $V_C$ (or the related second voltage). This is ideally achieved by providing an onboard DC-DC boost converter to boost a sub-500 Volt supply from the charging station to the greater than 500 Volt supply that is required to charge the battery back onboard the electric vehicle. The preferred embodiments of the invention are able to address this issue, without the need for complicated, redundant and expensive infrastructure, as will be appreciated by a skilled addressee from a reading of the whole of this patent specification.

Controller 17 is able to regulate high power transfers whilst accommodating different relative levels of $V_B$ (or the related first voltage) and $V_C$ (or the related second voltage), or similar levels of the first and second voltages. More particularly, controller 17 is able to accommodate changes in the relative voltage levels in real time through implementing selectively boost, buck, or buck-boost functions with one or both of controllers 17 and 18 whilst controlling the current profile. In this way, controllers 17 and/or 18 (or other similar controllers) are able to regulate the charging current from a regulated or unregulated DC source.

The term "an unregulated DC source" is reference to a DC source which does not provide the principal means of current control. This term includes semi-regulated voltage or current outputs. In the embodiments of the invention, station 5 need not regulate the current output as that is able to be done by the controllers 17 and/or 18 (or other DC-DC converters) that are onboard car 1. Making use of such an unregulated charging station enables significant reduction in the cost and size relative to a regulated external DC charging station. In some embodiments station 5 is a regulated DC charging station for certain electric cars, but otherwise an unregulated DC charging station. This allows the station, if originally designed for charging a particular car or cars, to be easily retrofitted to operate with a broader range of cars. If station 5 is able to provide regulated current at a higher power conversion rate than is able to be regulated by controllers 17 and/or 18, the onboard controllers are able to close the power-rail switches (for example, switch 48) they respectively control to operate in the first state while the external station 5 charges the onboard energy pack 3.

In other embodiments, station 5 is only a regulated DC charging station for electric vehicles and uses an internal storage device for grid services, as will be described in more detail below with reference to FIGS. 3 to 5, and FIGS. 13 to 16. Such services include one or more of: demand response; phase balancing; ancillary services such as voltage and frequency regulation; energy arbitrage; grid capacity reserve; and the like. In some such embodiments, station 5 uses the internal storage device as a power source from which to draw energy to define the regulated DC charging output.

Although charging station 5 is able to provide an unregulated supply, in that it does not regulate either or both of the load current drawn by and/or load voltage applied to the port 4, station 5 does include protection circuitry (not shown) to prevent dangerous currents from flowing or to isolate car 1 from station 5, should detected conditions dictate that either of those should occur.

Figure 3:
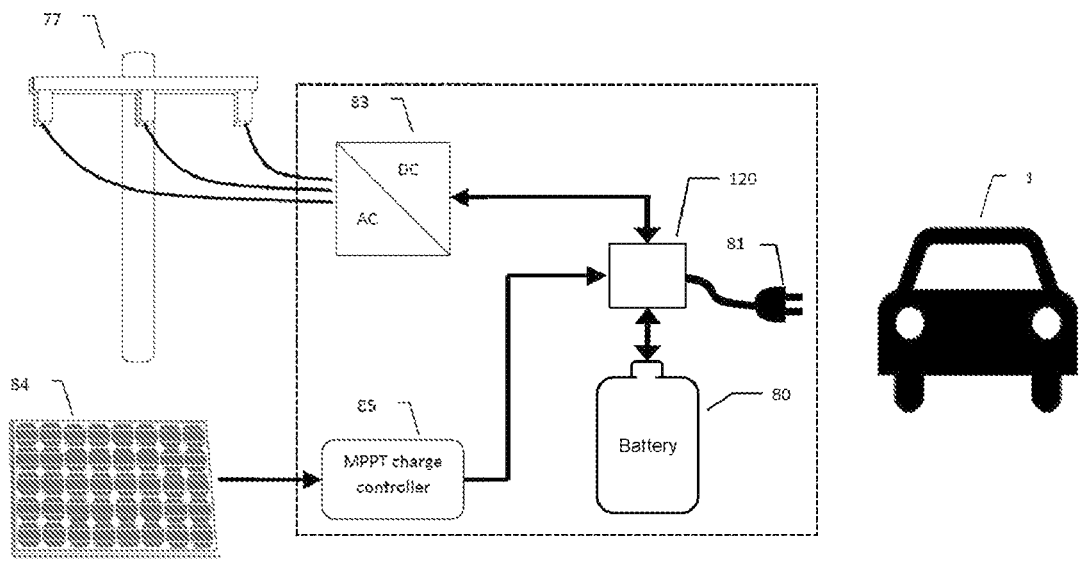
FIG. 3 illustrates schematically an embodiment of an electric vehicle charging station for the vehicle of FIG. 1.

A further embodiment of the invention is illustrated in FIG. 3, where corresponding features are denoted by corresponding reference numerals. In this embodiment, station 5 is a DC charging station having a second energy storage device, in the form of a bank 80 of batteries that is employed to, amongst other things, provide services to grid 77. In other embodiments, bank 80 is employed to reduce the impact of vehicle charging on grid 77. In this embodiment, bank 80 includes a plurality of batteries, but in other embodiments, use is made instead, or in addition, of supercapacitors, or any other energy storage devices such as inertial, thermal or kinetic energy resources. In the case of a battery and/or supercapacitor, the storage is natively DC and therefore an AC-DC converter 83 is used as part of an interface with grid 77 to charge the batteries from the grid. In this embodiment, AC-DC converter 83 is part of a grid interface and is rated at the maximum grid power available to station 5, and its operation is regulated by the grid to further satisfy load management.

The bank 80 is also able to be charged by another source, such as a renewable or intermittent source exemplified by onsite photovoltaic (PV) array 84. In this embodiment, array 84 is connected to pack 80 via a maximum power point tracking (MPPT) charge controller 85.

As illustrated in FIG. 3, converter 83 is bidirectional to create a two-way interface between bank 80 and grid 77, and is able to operate as a network energy storage device or energy resource. This, in turn, is able to provide significant advantages to an operator of grid 77.

In the embodiments illustrated in FIGS. 3 to 5 and 13 to 16 there is provided a control circuit 120 (illustrated schematically as one or more switches) to fully or partially selectively isolate bank 80, and/or an MPPT controller 85 (not shown in FIG. 4 or 5, or 13 to 16, but exemplified by the correspondingly numbered controller in FIG. 3), and/or converter 83, from the electric vehicle interface 81, or to/from each other. Circuit 120 is able to selectively connect or disconnect converter 83, bank 80, controller 85, and/or any relevant electric vehicle interface(s) such as interface 81 or coupler 126 and/or 127, to or from each other. In this way, station 5 is able to operate in multiple modes to provide either a regulated DC or unregulated DC output to car 1 and/or any other attached vehicle(s).

Figure 14:
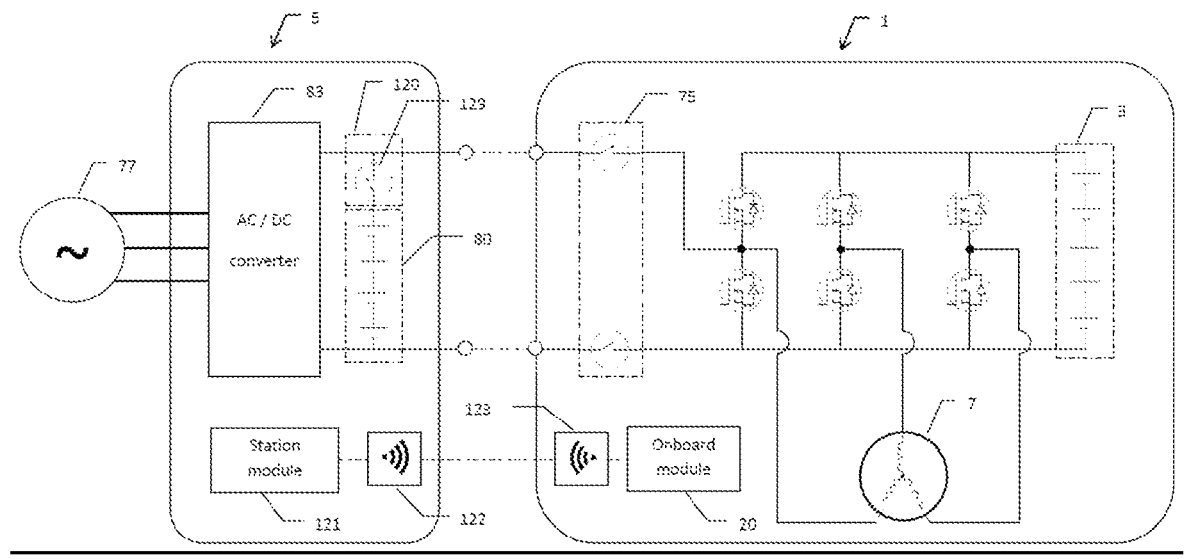
FIG. 14 is a schematic of a further electric vehicle charging station coupled to an electric vehicle.
Figure 15:
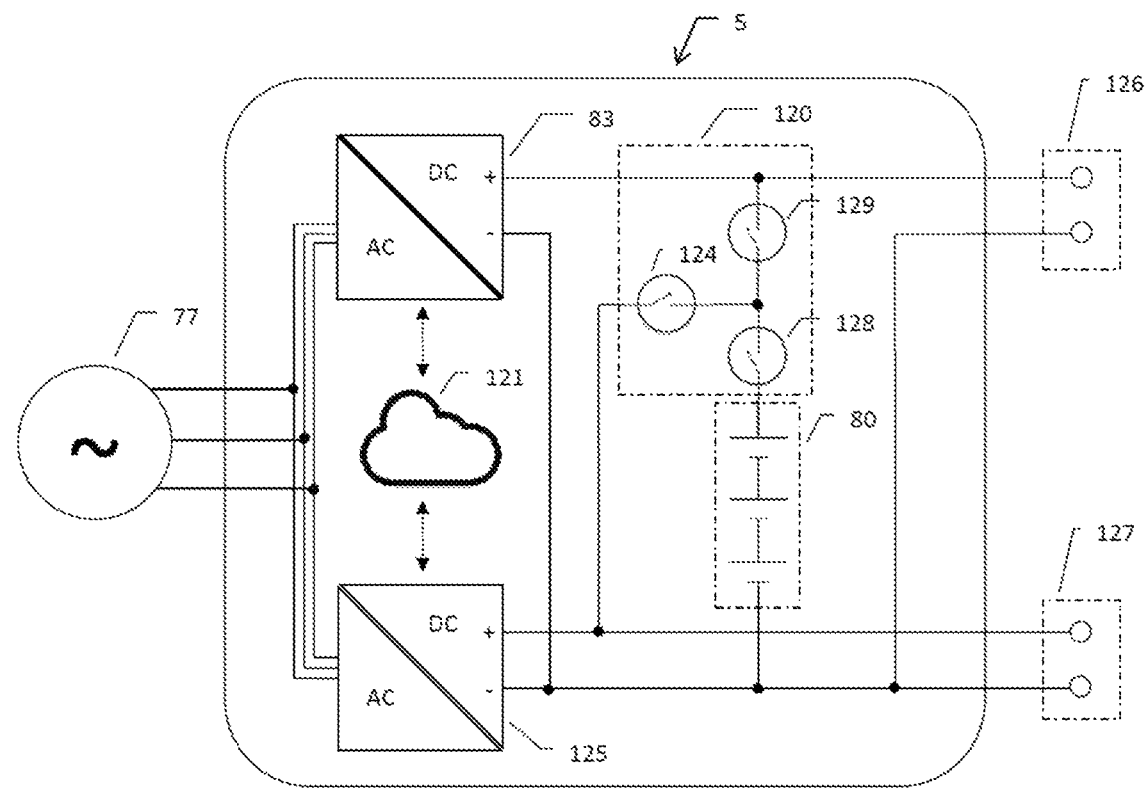
FIG. 15 is a schematic illustration of an electric vehicle charging station with multiple output couplers capable of charging multiple electric vehicles.

In some embodiments controller 120 includes other components such as a plc or microcontroller or microprocessor, as well as the relevant software and interconnections to enable the control that is described herein. In other embodiments, controller 120 is controlled from a supervisory controller, such as station module 121 (as best shown in FIGS. 13 to 15).

As controller 17 and/or 18 of car 1 are able to regulate the charging current from an unregulated DC source, the charging station 5 need only have an EV interface, such as the illustrated plug 81, to allow for a high power DC connection between car 1 and bank 80. Furthermore, station 5 is able to include multiple EV interfaces for allowing multiple vehicles to draw energy from pack 80 and charge in parallel. The cost of adding EV interfaces, such as plug 81, is comparatively low, which means a single or multi-port fast charging station is able to be provided much less expensively than prior art charging station systems. Moreover, the preferred embodiments provide a battery buffer which would otherwise require external charging equipment per vehicle to be charged in parallel. In the preferred embodiments, station 5 also includes a secondary communication module 121 (only shown explicitly in FIGS. 13 and 14) for communicating with a first communication module in the form of onboard module 20 fitted to car 1, and other vehicles. In the embodiments illustrated in FIGS. 3 to 5 and 13 to 16, the maximum allowable charging power able to be drawn by car 1 or bus 89 from station 5 is the sum of the maximum power of converter 83, plus the maximum discharge power of pack 80, plus the instantaneous power from controller 85 (not shown in FIG. 4 or 5, or 13 to 16, but exemplified by the correspondingly numbered controller in FIG. 3), minus the power draw of any other vehicles attached to station 5.

In embodiments where station 5 also includes a bidirectional converter 83 to interface with grid 77, car 1 is also able to provide energy to grid 77 via the bidirectional nature of the buck-boost sequence managed by controller 17 (or another onboard controller), and the inverter functionality offered by the bidirectional converter 83.

In other modes of operation, car 1 is able to provide an unregulated DC voltage to station 5 which is fed to converter 83 to provide vehicle-to-grid (V2G) services. Controller 120 is able to selectively couple or decouple bank 80 during this mode of operation.

Similarly, converter 83 is able to draw upon energy in bank 80 to provide energy or grid services to grid 77. Bank 80 is able to be simultaneously recharged by array 84 (shown in FIG. 3), or by car 1 with controller 17 or other onboard regulator acting in bidirectional or V2G mode. Similarly array 84 is able to provide energy or grid services to grid 77 via converter 83.

In preferred embodiments, station 5 is able to replenish bank 80 from grid 77 via converter 83, and/or from array 84 via controller 85, and/or another source, where available, whilst car 1 is charging such that a fraction, or the entire, of the charging power drawn by car 1 is derived from grid 77 and/or array 84 and/or another source. In other embodiments, station 5 does not include an electric grid interface, and is powered only by an onsite resource, such as array 84, or another source. In further embodiments, controller 17 also acts as the MPPT charge controller for array 84, and the dedicated controller 85 is eliminated. In still further embodiments, station 5 only includes an energy generation or storage device such as array 84, or other unregulated DC source or sources, and an EV interface 81. In any embodiment where station 5 provides a DC source, car 1 does not need to include an inverter and/or rectifier within circuit 75 (see FIGS. 12 and 13) to charge from the DC source.

Figure 12:
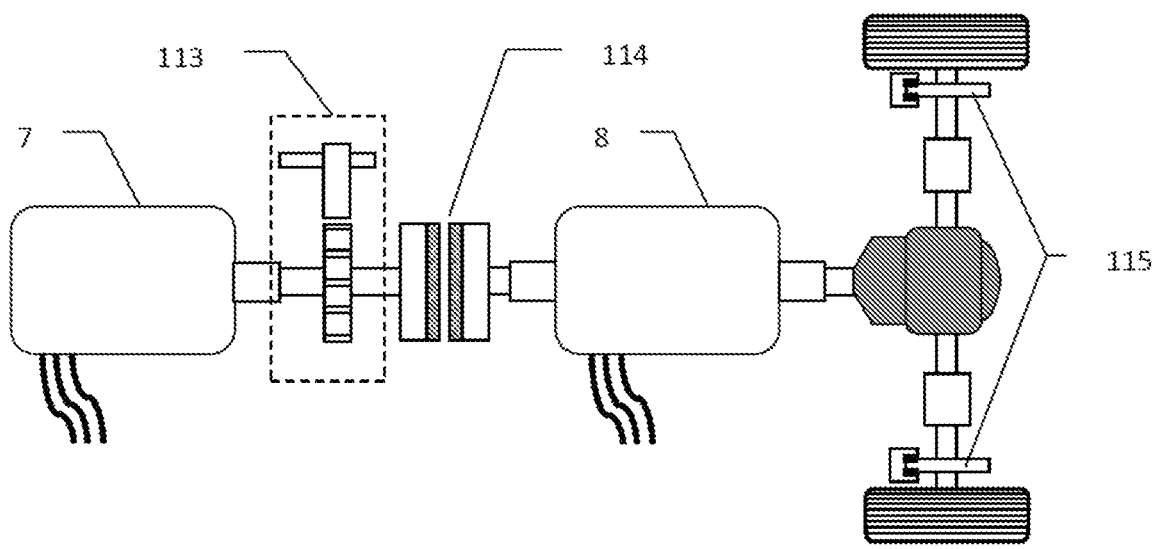
FIG. 12 is a schematic representation of a vehicle according to a further embodiment of the invention.

Station 5 of FIG. 3 is able to operate in different modes, which is controlled by controller 120. Examples of a suitable controller is illustrated in FIGS. 12 and 13 as a supervisory controller module 121.

Figure 4:
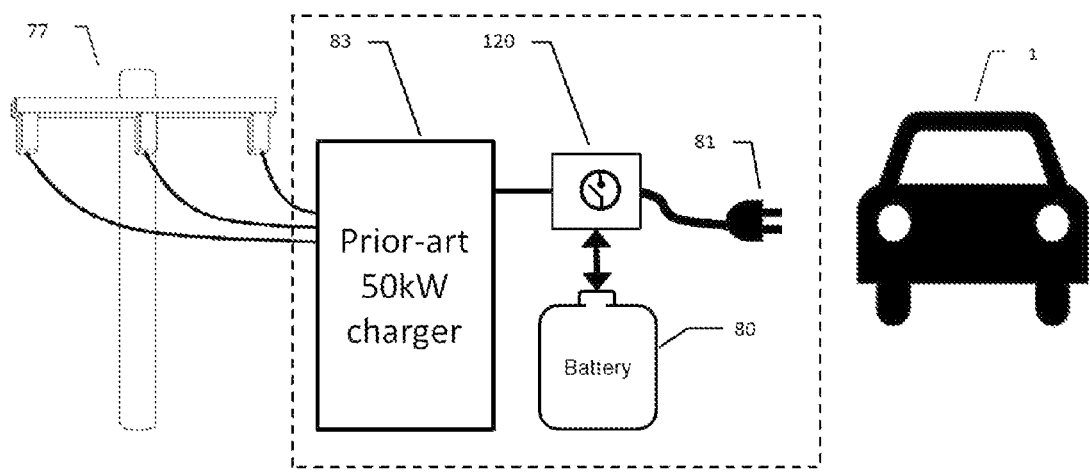
FIG. 4 illustrates schematically an embodiment of a charging station for the electric vehicle of FIG. 1, being a prior art charge station retrofitted to enhance it functionality.

Reference is now made to FIG. 4 where corresponding features are denoted by corresponding reference numerals. FIG. 4 illustrates a 50 kW prior art charging station for an electric vehicle which has been upgraded with an energy storage device in the form of a battery bank 80 to define an embodiment of the present invention. In this embodiment, the output of the existing bidirectional AC-DC converter 83 is also fitted with an isolation circuit which is integrated within controller 120, or controlled by controller 120, but not explicitly illustrated in FIG. 4. The resulting upgraded charging station 5 is able to operate in multiple modes as controlled by a suitable supervisor controller module 121 which is integrated within controller 120 but not explicitly illustrated in FIG. 4. As will be appreciated by those skilled in the art, module 121 is able to be an additional module, or an adaption of an existing controller of converter 83 (as is the case in FIG. 4). Where module 121 is an addition, it preferentially communicates with the existing controller.

In a first mode of operation, converter 83 provide at least one of a regulated charging current and/or a regulated charging voltage to car 1 via plug 81. In this mode, the isolation circuit controlled by or part of controller 120 isolates bank 80 partially or fully from both the output of charger 83 and plug 81.

In a second mode of operation, converter 83 provides at least one of a regulated current and/or a regulated voltage to bank 80. In this mode, controller 120 uses an isolation circuit (not shown) incorporated within the controller) for partially or fully connecting bank 80 to the output of converter 83.

In a third mode of operation, station 5 outputs an unregulated DC voltage to car 1 via plug 81. In this mode, controller 120 uses the isolation circuit within controller 120 partially or fully connects bank 80 to plug 81. In this mode, a car 1 with an onboard DC charger, such as controller 17, is able to draw current from station 5 to regulate onboard at least one of a charging current and/or a charging voltage.

In a fourth mode of operation, which is available where converter 83 is bidirectional, station 5 is able to draw energy from pack 80 supply this energy or services to grid 77. In this mode, controller 120 uses the isolation circuit within controller 120 partially or fully connects bank 80 to converter 83, such that prior-art converter 83 draws a current from bank 80 to invert and supply to grid 77. This mode is able to be referred to as a charger-to-grid mode or C2G.

In a fifth mode of operation, which is available where converter 83 is bidirectional, station 5 is able to draw energy from car 1 and supply this energy or services to grid 77. In this mode, controller 120 uses the isolation circuit within controller 120 partially or fully connects interface 81 to converter 83, such that prior-art converter 83 draws a current from car 1 to invert and supply to grid 77. In some embodiments using this mode, car 1 does not have an onboard DC charger and therefore controller 120 uses the isolation circuit within controller 120 partially or fully isolates bank 80 during this time. This mode is able to be referred to as vehicle-to-grid mode or V2G.

Station 5 is able to operate in multiple modes concurrently, and modes are not necessarily mutually exclusive. For example, station 5 is able to operate in the second and third modes simultaneously such that converter 83 supplies current to both bank 80 and car 1. In this example, the current supplied to or sourced from car 1 or bank 80 is able to be either negative or positive. For example, car 1 is able to draw current from both bank 80 and converter 83 during this time.

Similarly, station 5 is able to act in the third and fourth modes simultaneously. In this example, bank 80 is able to supply current to both car 1 and converter 83 for charger-to-grid operation.

Other combinations of modes may be used. For example, the fourth and fifth modes are able to be used to simultaneously draw energy from both bank 80 and an attached car 1 to supply energy or services to grid 77. In this combination mode, car 1 ideally has an onboard bidirectional converter such that it regulates the proportion of current which it supplies to converter 83.

In a further embodiment, station 5 includes a network of overhead wires or the like to define at least a second pair of terminals. Moreover, car 1 includes a pantograph or any other structure or structures for supporting a first pair of terminals that are selectively interfaced with the second pair of terminals of station 5. In such embodiments, station 5 is able to supply either AC or DC power to the vehicle. In such cases, car 1 is able to make use of existing infrastructure without modification to the external infrastructure. For example, car 1 is able to be configured to interact with supply infrastructure used by a train, tram, trolley bus, or the like. The onboard storage of pack 3 in car 1 enables the car to become untethered from such infrastructure for periods of time, enabling a more versatile system than is presently able to be enjoyed by the trains, trams, or trolley buses that traditionally operate in continuous electrical connection with such infrastructure. This enables high power opportunity charging of car 1, such as at a bus stop or traffic light, to occur with minimal cost to the vehicle or infrastructure. Existing opportunity charge solutions for BEV undesirably require a high power AC-DC or DC-DC converter to existing within station 5 to provide a regulated DC charging current to the vehicle, adding cost to infrastructure. As detailed in this application and the Earlier Application, controller 17 is operable to regulate this externally received power whilst the vehicle is stopped, or whilst moving. Car 1 is also able to operate in the first state while drawing power from station 5, such as for manipulating rotor position, or providing locomotion power from the external source. In some embodiments, at least one of the poles of the onboard pack 3 is electrically disconnected from the drive circuits of controller 17 during operation in the first state, such as to prevent unabated power transfer between pack 3 and station 5. In some embodiments, while controller 17 acts in the first state, a charging current is regulated to pack 3 via other means, such as a switch acting in PWM mode, or a further motor and controller (such as controller 18) or machine winding set acting in the second state. In further embodiments where pack 3 is a lower voltage than that applied by station 5, pack 3 is connected such that it may only supply or receive power (such as through the use of a diode) when operating in the first state and connected to station 5. In some embodiments, one or more controllers (such as controller 17 and/or controller 18) are able to swap between the first and second state, or act simultaneously in the first and second state, depending on the required operation whilst remaining electrically coupled with station 5. This means, in some embodiments, controller 17 and/or controller 18 are able to provide propulsion to car 1 and charge pack 3 simultaneously using power from the external energy source. In some embodiments, an isolation DC-DC converter is used as part of an input circuit for controller 17 and/or controller 18 to ensure touch safe operation of the vehicle while tethered to a power source, especially where the external power source is not isolated from earth.

Figure 5:
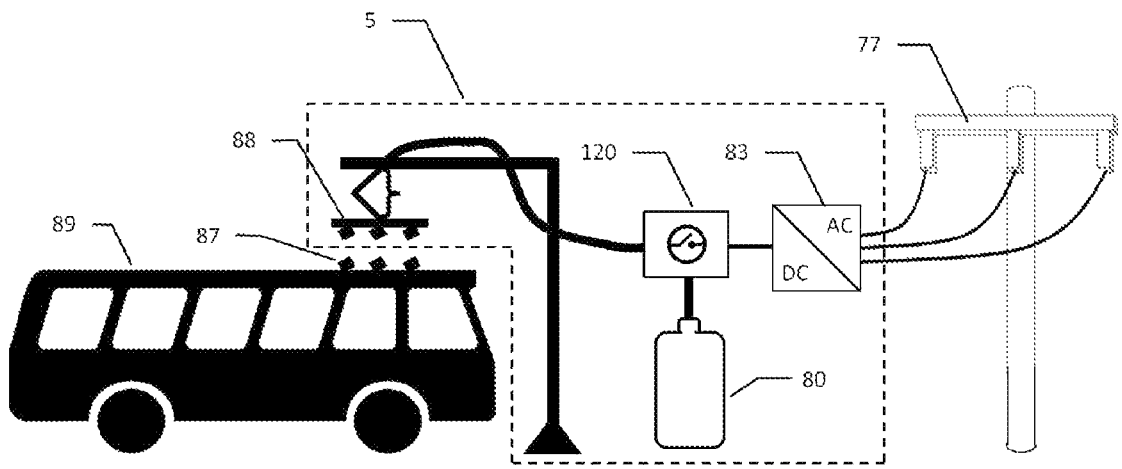
FIG. 5 is a schematic representation of a charging station for an electric bus according to an embodiment of the invention.

Reference is now made to FIG. 5 which illustrates an electric bus 89 charging from station 5 via a first coupler. The station includes a second coupler in the form of an inverted pantograph 88 having three spaced apart terminals. Also included is an intermediate storage source, in the form of battery bank 80, an isolation circuit for the intermediate storage source (in the form of controller 120), and an interface to grid 77 having an AC-DC converter 83. In other embodiments, other than three spaced apart terminals are used.

In this embodiment, single or 3-phase AC power from grid 77 is rectified with PFC in converter 83 (which is galvanically isolated) to charge bank 80. As bus 89 approaches station 5, a wireless communication is initiated by a first communications module mounted to bus 89 and is received by a second communications module at station 5. In response to the communication, pantograph 88 is lowered such that the first and the second terminals are coupled by being brought into electrical contact to create an electrical connection between the pantograph 88 and the bus's onboard interface 87. Through this contact, station 5 provides bus 89 an electrical connection to the anode and cathode of bank 80 through the protection circuits and isolation circuits defined by controller 120. In other embodiments, station 5 uses the isolation circuits defined by controller 120 to provide bus 89 with a connection to the positive and negative DC output of converter 83 in addition or instead or the anode and cathode of bank 80. The third electrical contact of the coupling provides bus 89 with a powered earth conductor.

In further embodiments, the interface between bus 89 and charging station 5 has other than three terminals.

In other embodiments, converter 83 does not provide galvanic isolation.

In other embodiments, a control pilot is used to take over from the wireless communicate once an electrical connection is established.

In other embodiments, the pantograph is located on bus 89, and the corresponding interface is located on charging station 5. In further embodiments, other electrical conduction systems are used. In still further embodiments, power is transferred wirelessly and the coupling between the bus and the station is achieved with a wireless coupling rather than a direct electrical coupling.

Returning to the specific embodiment in FIG. 5, once an adequate electrical connection has been made, the battery or other storage device (not shown) onboard bus 89 is able to be charged, or to discharge into station 5. In a first mode of operation, charging station 5 provides at least one of a regulated charging current or a regulated charging voltage to the onboard battery of bus 89. In this mode, controller 120 partially or fully isolates bank 80 from the output terminals of pantograph 88, and either partially or fully connects converter 83 to the output terminals such that converter 83 supplies the at least one of a regulated charging current or regulated charging voltage.

In a second mode of operation, converter 83 is responsible for providing at least one of a regulated charging current or a regulated charging voltage used for charging bank 80. In this mode, controller 120 partially or fully connects bank 80 to the positive and negative outputs of converter 83 such that it can provide the at least one regulated charging current or regulated charging voltage to bank 80.

In a third mode of operation, station 5 supplies an unregulated DC output voltage to bus 89. In this mode, controller 120 partially or fully connects bank 80 to the output terminals of pantograph 88 such that bus 89 draws a charging current. In this mode, converter 83 is also able to be partially or fully connected via controller 120 to supply some of the charging current drawn by bus 89. If converter 83 is able to supply all of the charging current drawn by bus 89, excess current produced by converter 83 is used to charge bank 80. In this mode, the precise operation of converter 83 and controller 120 provides a constant voltage output, or semi-regulated voltage, to the outputs of pantograph 88. However, as the regulation is limited well below the maximum rating of station 5, this will also be referred to as providing an unregulated DC voltage in this specification. In this mode, it is assumed that controller 17 (not shown) uses its onboard power electronics and machine 7 (not shown) to facilitate an efficient and effective charging of pack 3 (not shown) via operating in the second state.

In other embodiments, bus 89 uses a dedicated or other onboard controller to facilitate the charging of its onboard energy storage from station 5.

In further embodiments, station 5 uses an unregulated DC voltage, or semi-regulated DC voltage, to provide a charging voltage directly to the onboard battery of bus 89. The current drawn by the electrical load presented by bus 89 is able to be supplied entirely by either of bank 80 or controller 83, or a combination of both depending on the operation mode of controller 120. When bank 80 is connected as part of the circuit a higher power charge of bus 89 is enabled. Moreover, bank 80, acts as a buffer of energy drawn from the grid, therefore converter 83 need not be rated at the maximum power capability of the charge.

In a fourth and fifth mode of operation, station 5 supplies power back to grid 77. In the fourth mode, controller 120 allows converter 83 to draw a current from bank 80 to provide energy back to grid 77. In the fifth mode, controller 120 allows converter 83 to draw current attached bus 89 via pantograph 88 to provide energy back to grid 77. The fourth and fifth modes are not mutually exclusive, and controller 120 is able to partially (that is, discontinuously) or fully (that is, continuously) connect either bank 80 or bus 89 through pantograph 88 such that current is drawn from either or both sources simultaneously, alternatively, and in any proportion.

In this embodiment, converter 83 is galvanically isolated from grid 77 and station 5 is considered an Isolated Terra (IT) system, however in other embodiments converter 83 is not isolated. In other embodiments, bus 89 includes a separate onboard DC-DC converter for charging pack 3 from an unregulated DC voltage presented by station 5. This converter is controlled by controller 17 (or another controller) and in some embodiments also provides galvanic isolation.

In further embodiments, station 5 also includes a further DC-DC converter, or uses converter 83 to provide the converter functionality (such as provided in the embodiment illustrated in FIG. 16), for charging the onboard pack 3 in bus 89, or other electric vehicle that is being recharged at station 5, from bank 80. In such embodiments, controller 17 is able to negotiate through its communication with station 5 (where that communication occurs via the first and second communications modules) whether the external converter, or any onboard controller, will charge pack 3. When converter 83 is used to charge bus 89, station 5 is able to isolate, or at least electrically disconnect from the circuit, bank 80 such that it does not interfere with the charging cycle. In this way, station 5 is backwards compatible for charging prior art vehicles.

In vehicles equipped with an onboard converter in the form of controller 17, that controller is able to allow the external converter to charge the onboard pack 3 by closing switch 48 and providing a direct connection to pack 3. In this way, bus 89 is backwards compatible with prior art DC charging stations.

If any off-board DC-DC converter provided by station 5 is more powerful the onboard DC-DC converter, then the off-board converter is selected to charge pack 3. If the power capabilities are equal, or if (for example) the onboard converter is overly hot, the off-board converter is also selected. Other conditions may determine whether the onboard of off-board converter is used to charge pack 3.

In embodiments where station 5 does not include an off-board converter capable of charging vehicles directly, the station is not compatible with vehicles that do not include a means of facilitating the charge onboard (that is, an onboard DC-DC converter), and therefore station 5 communicates with other such vehicles, or does not lower its inverted pantograph or present its terminals, or does not provide a voltage or current to the second coupler, and/or otherwise isolates the second coupler via controller 120 or other protection circuit, so that the non-compatible vehicle cannot attempt to charge.

In preferred embodiments, the first and second communication modules are compatible with existing electric vehicle charging communication protocols such that communication with other charging stations and other vehicles respectively is possible. In other embodiments, the communication link between the first communications module and the second communications module is not wireless and is transferred electrically. In one embodiment, the communication link is provided by further terminals on the pantograph and the corresponding interface.

In other embodiments, bank 80 includes an ultra-capacitor bank or other means of energy storage.

In preferred embodiments, bank 80 is able to be selectively partially or fully connected or disconnected from the circuit defined within station 5. In one such embodiment, station 5 includes a controller 120 which includes one or more electrical switches to partially or fully electrically isolate or disconnect bank 80 from the output rails of converter 83, plug 81 and/or the output of pantograph 88.

In other embodiments, station 5 sources or derives power from other infrastructure, for example, a DC source provided to power a tram or train. In some embodiments, station 5 is powered by one or more renewable resources. In some embodiments, station 5 represents a DC micro-grid.

In some embodiments converter 83 is bidirectional and bank 80 is responsive to conditions to either supply or draw energy to and from grid 77. In some embodiments, converter 83 also provides a bidirectional link for bus 89, wherein bus 89 is able to supply energy to or draw energy from grid 77 when the bus is not required to operate. In further embodiments, station 5 includes one or more further energy sources such as an array of solar panels.

In some embodiments, bus 89 also includes an input port 4, for receiving AC power from the grid through another charging station. In such an embodiment, an input circuit complete with rectifier is fitted between controller 17 and port 4. This enables bus 89 to charge from either DC through the pantograph, or AC or DC through charge port 4. In some embodiments, when bus 89 is charging via pantograph, the input circuit is bypassed, and therefore does not need to be rated at the same power level.

Reference is now made to FIG. 13 where corresponding features are denoted by corresponding numerals. Car 1 includes a DC energy source illustrated as pack 3, a traction motor illustrated as machine 7 operated by controller 17, a first coupler, and a first communications module 123. Station 5 is controlled via station module 121, and includes a second coupler, a second communications module 122, and a bidirectional AC-DC converter 83 which interfaces with energy source in the form of grid 77. Converter 83 provides a galvanically isolated connection to bank 80 and car 1. A controller 120 comprises, at least in part, of one or more battery disconnect switches which are able to partially or fully connect or disconnect bank 80 from the common power rail(s) of the second coupler and converter 83. In the present embodiment, this battery disconnect switch is illustrated as switch 129. In a further embodiment, controller 120 comprises, at least in part, of one of more switches which are able to partially or fully connect or disconnect bank 80 from either or both of the second coupler and converter 83.

In a first mode of operation of station 5, battery disconnect switch 129 (which defines in part controller 120) is opened to provide isolation, or partial or full electrical disconnection, of bank 80 from the second coupler and converter 83. After first charging data is received and couplers have coupled, converter 83 provides at least one of a regulated DC charging current or a regulated DC charging voltage to the second coupler. Controller 17 acts in its first mode of operation by closing switch 48 and allowing the regulated DC voltage or current to directly charge pack 3. In another embodiment, where the car or other vehicle does not have an onboard controller 17, the first coupler is connected directly or indirectly to pack 3 onboard car 1.

In a second mode of operation of station 5, with the battery disconnect switch closed (that is, enabling a partial or full electrical connection), converter 83 provides at least one of a charging current or charging voltage to bank 80. The second mode of operation is not mutually exclusive from the third mode of operation described below. When operating in the second and third modes concurrently, converter 83 is able to charge bank 80 whilst controller 17 draws upon the DC voltage presented at the second coupler to charge pack 3.

If in the second mode car 1 draws a charging current which is equal to or larger than the current supplied by converter 83, then all of the current from converter 83 is supplied to car 1. Module 121 of station 5 is able to instruct control module 120 to modulate the battery disconnect switch 129 (through controller 120) and the output of converter 83 to control the amount of current drawn from or supplied to each source.

In a third mode of operation, after a first set of data has been communicated between the first and second communications modules, and the first and second couplers have coupled, station 5, with battery disconnect switch 129 (which is part of controller 120) closed, presents an unregulated DC voltage to the second coupler such that controller 17 is able to regulate at least one of a DC charging current or a DC charging voltage to charge pack 3.

In another embodiment, where the car or other vehicle has a different onboard controller to controller 17, it is open to use that different controller to charge the relevant pack 3.

In a fourth mode of operation of station 5, with the battery disconnect switch 129 (which is part of controller 120) closed, converter 83 draws current from either bank 80, or pack 3 onboard car 1 to provide energy or services to grid 77. The fourth mode of operation is not mutually exclusive form the third mode of operation. For example, bank 80 is able to supply current to both car 1 through the first and second couplers, and to grid 77 via bidirectional converter 83.

In some embodiments, a further energy source is connected to station 5, such as an array of solar panels 84 (not shown in this embodiment but exemplarily illustrated in FIG. 3).

In some embodiments, station 5 is not connected to grid 77, and operated in a completely decentralised manner using only energy derived from a further energy source, such as a solar array.

In some embodiments, converter 83 is a DC-DC converter and uses power from a DC source, or a common DC bus.

In this embodiment, car 1 includes input circuit 75 which includes disconnect power switches for safety and forms part of the charging initiation process. For example, after the first charging data is received, module 20 is able to operate controller 17 in the second state to pre-charge the bulk capacitance of controller 17 before closing the disconnect switches in input circuit 75 to prevent an inrush current. Input circuit 75 also includes, at least in some embodiments, other safety mechanisms such as isolation monitoring and fusing.

In a specific example of this embodiment, the vehicle is a bus, converter 83 is rated at 150 kW, and bank 80 is a 150 kWh battery pack and capable of 1 C charge rate (150 kW), and 2 C discharge (300 kW). The total output able to be provided to the bus is 450 kW. In this case, the 150 kW/150 kWh station 5 is significantly cheaper, with smaller volume and weight than a comparable 450 kW charger. Further to this, the 150 kW/150 kWh station 5 presents less peak load to the grid, requiring a grid connection a third of the capacity required by the 450 kW charger. This means it is less likely that the electrical infrastructure of grid 77 servicing the charging station of the embodiment of the invention will need upgrades in order to account for the peak demand of the station. All else being equal, the operator of station 5 is able to have a lower operation costs than a prior art charging station due to the ability to use the battery to peak shave to reduce peak demand charges, and load shift to utilise cheaper off-peak electricity rates. Further to this, as converter 83 is bidirectional, the 150 kW/150 kWh station 5 represents a standalone asset with a battery capacity that, together with the battery capacity of any connected electric vehicle with a bidirectional DC-DC converter, is able to be used to generate income through providing energy and services to the grid. In such cases, services are able to be selected from voltage and/or frequency control, grid capacity energy reserve, demand response, energy arbitrage, phase balancing, or the like.

In a specific mode of operation, bank 80 is able to discharge to the bus, whilst simultaneously discharging to converter 83 such that station 5 is able to provide grid services even while the station is in use for charging a vehicle with an onboard DC-DC converter. This enables station 5 to meet simultaneous obligations to provide services to the network operator of grid 77, and to the operator of bus 89.

The above capabilities allow station 5 to deliver a lower total cost of ownership and/or to generating income and thereby provide a more positive return on the investment required.

In another embodiment, controller 17 or another DCDC converter onboard car 1 is controlled via onboard supervisory controller module 20. In a further embodiment, the functionality of module 20 is provided by controller 17.

In some embodiments, module 20 and/or module 121, has communication with electric vehicle fleets, bus route time tables, the electrical network, wholesale energy markets, renewable energy sources, weather forecasts, and/or other networked energy storage such as other charging stations, to make decisions on whether and when to use its onboard energy for grid benefit and secondary income generation. Due to the asset nature of station 5, other ownership models of the infrastructure are possible. Such ownership models include having a third party, such as the electrical utility, generator, or retailer, supply and manage the charging infrastructure, while billing the bus or other vehicle operators or owners for use of the infrastructure. In such embodiments, the vehicle charging station operator may use the stationary battery asset, along with any connected vehicle's battery asset, and the bidirectional converter for providing benefit to the electrical grid.

In some embodiments, station 5, and other like stations, are aggregated as part of a virtual power plant (VPP). These charging stations are able to be centrally controlled or otherwise combined to provide collectively grid services and to compete in wholesale markets under the guise of a single entity.

In other embodiments, the communication between the first and second communication modules is other than wireless, such as provided by a wired connection through the couplers.

In other embodiments, the primary and secondary couplers are coupled wirelessly, through a pantograph, or plug and receptacle/input port.

In some embodiments, bank 80 and/or controller 120, are not integrated into station 5, and/or are added retrospectively to the deployment of station 5.

In further embodiments, the primary purpose of bank 80 is to provide a bidirectional storage medium for bidirectional converter 83 to provide grid services or energy trading with grid 77. In some instances, the battery switching mechanism contained or controlled by controller 120 does not provide an electrical path for bank 80 to supply or receive power to and from the secondary coupler. Alternatively, station module 121 is able to be programmed to be locked out of the first state notwithstanding the hardware is available to operate in that state.

In some embodiments, bank 80 is a battery pack retired from another application. This use of second life batteries— for example recovered from an electric vehicle—allows for further cost savings to be realised in the set-up of station 5.

The embodiments of the invention also include those pre-existing installations for providing grid or local storage services. These installations are able to be converted into a station 5 to provide electric vehicle charging functionality with the addition of an electric vehicle charge interface and a communications module, as set out above.

In further embodiments, station 5 derives its power from one or more power sources, in conjunction with or instead of grid 77, such as the addition of a solar PV panel.

In some embodiments converter 83 is a DC-DC converter, or multimode converter.

In some embodiments, converter 83 includes maximum power point tracking (MDPT).

In some embodiments, station 5 includes a protection circuit or circuits and/or a filter or filters between the battery switching mechanism contained or controlled by controller 120 and/or bank 80 and/or coupler 126.

In other embodiments, controller 17 does not regulate the onboard charging current, but instead a further onboard DC-DC converter is employed. This further DC-DC converter is able to be galvanically isolated.

In further embodiments, input circuit 75 includes further inductance which is used to increase the inductance of a DC-DC boost conversion process.

In some such embodiments, input circuit 75 also includes a freewheeling diode to assist any input boost inductors employed.

In other embodiments, controller 17 takes on a topology not illustrated explicitly in the present patent specification for acting as a DC-DC converter to regulate the charging current and/or voltage to pack 3.

Reference is now made to FIG. 14 where corresponding features are denoted by corresponding numerals. The control of the charging station in this instance is similar to that detailed for FIG. 13. In this embodiment, controller 17 does not break the power rail, but instead accepts a positive DC input from station 5 at the phase leg of one of the drive circuits. In this instance, controller 17 acts as a boost converter only and the voltage presented at the coupler via station 5 must be lower than the voltage of onboard pack 3 so controller 17 is able to regulate the charging current. In this topology, the lower switches of the drive circuits, other than the drive circuit connected to the secondary DC input, are pulsed to create a current flowing in the motor phases. This current then flows through the upper switch freewheeling diodes during the off-pulse to form a charging current for pack 3.

In another embodiment, a capacitor is provided in the input circuit 75 on the charger side of the disconnect switches to smooth out the input of the charger.

In further embodiments, the secondary DC input is input on the positive power rail of controller 17, and input circuit 75 includes high power inductors to be used as part of a boost circuit. In this topology, a boost diode is required on the primary DC input connecting controller 17 to pack 3, allowing boost charge current to flow through the diode and charge pack 3. In this case, both top and bottom switches of all drive circuits are able to be pulsed to create the boost charging current.

In some embodiments of station 5, multiple couplers exist to interface with multiple vehicles at any one time with each coupler being able to draw upon the energy of bank 80. In this case, multiple vehicles are able to connect and charge from the unregulated source of station 5 without requiring multiple off-board converters. The use of multiple converters capable of charging bank 80 in parallel allows each converter to disconnect from the battery to charge a vehicle without an onboard charge controller.

Reference is now made to FIG. 15 where corresponding features are denoted by corresponding numerals. In this embodiment there are provided two external converters in the form of converter 83 and a converter 125. The output of each converter is electrically connected to a coupler for coupling with an electric vehicle. That is, converter 83 is connected to coupler 126, and bank 80 via switch 129 (which is a subset of the controller 120), and converter 125 is connected to a coupler 127, and bank 80 via a switch 124 (which is a subset of the controller 120). In this embodiment, each converter, disconnect switch, and coupler, is controlled via module 121 which is connected to the cloud. Each converter is also able to able be connected to or disconnected from stationary storage bank 80 via a switch 128 and/or switches 129 and 124 respectively (which are all subset of the controller 120). In this way, module 121 is able to instruct controller 120 to individually present either a regulated DC current or voltage, or an unregulated DC voltage at each coupler output for the purposes of charging respectively coupled electric vehicles. In this embodiment, switch 128 is employed to enable bank 80 to be disconnected from the star point connection of switches 129 and 124, such that the positive power rails of the output of the two converters become common and both converters jointly act in parallel to provide a regulated DC charge to one electric vehicle at either coupler. In other embodiments, switch 128 is not employed.

In some embodiments, each output coupler for charging vehicles includes an output circuit (not shown). That is, an output circuit is implemented between the secondary coupler and the external converter 83 and/or bank 80. This output circuit includes, at least on some embodiments, safety mechanisms such as fusing, earth leakage detection, disconnect switches, and/or the like. In some embodiments, the output circuit also includes a filter and/or capacitor for smoothing ripples in the charging current and/or charging voltage. In embodiments where multiple secondary couplers exist, each with an output circuit that includes disconnect switches, the output circuits are able to be used such that any connected vehicles may be connected or disconnected in sequence. This is advantageous, for example, for charging multiple coupled vehicles individually or sequentially via the external converter or converters, and/or for mitigating earth leakage current at any given time.

In the present embodiment, each converter includes galvanic isolation. In some embodiments, the negative power rails of each converter and coupler are able to be disconnected to maintain galvanic isolation between vehicles being charged. In other embodiments, a common galvanic isolation module is employed and forms part of an input circuit provided to each converter.

In further embodiments, converter 83 and converter 125 are DC-DC converters with a common DC input link. In such embodiments, a common AC-DC converter is able to be provided as part of an input circuit for connection to grid 77, or the input energy source is able to be DC. In these cases, each converter is able to provide galvanic isolation, or isolation is able to be provided by the common input AC-DC converter or input circuit. In other embodiments, the input circuit also includes safety features such as isolation monitoring, fusing, and voltage and current feedback. In further embodiments, other than two converters and/or other than two couplers exist, and as such the charging station is scalable to charge any number of vehicles. In such cases, multiple switches and electrical paths are able to be established to enable multiple groups of converters to provide either unregulated or regulated DC at different couplers.

In still further embodiments, converter 125 and coupler 127 are part of a separate charging station with its own stationary storage bank.

In still further embodiments other than two couplers exist, and/or other than two external converters exist. In some embodiments, there are more couplers for interfacing with electric vehicles than there are external converters in station 5. In this case, vehicles are required to include their own onboard controller to charge from station 5 simultaneously. Vehicles without a suitable onboard controller are able to be charged in sequence by the external converter(s), where power is directed using the switches connecting the converter(s) to bank 80, and the output circuits on each coupler.

In some embodiments, module 121 is responsible for controlling multiple charge stations, or responsible for communicating and being responsive to a master module, or other charging stations.

In some embodiments where multiple converters are attached to the same storage bank, or multiples of charging stations exist within a site, charging station 5, or at least one converter within charging station 5, is able to draw power from bank 80 and return the energy to the input circuit to buffer the power load from another converter or charging station. For example, in the present embodiment, with switches 124 and 128 open, and switch 129 closed, converter 83 is able to operate bi-directionally and draw power from bank 80 to supply power back to the common input source such that buffered power is available for converter 125 to regulate a charge for a vehicle coupled to coupler 127 without drawing, or minimising, energy from grid 77. Similarly, converter 83 and/or converter 125 are able selectively to operate bi-directionally to feed power back to the grid for use by another charging station.

In some embodiments, module 121 engages station 5 in operations of a wider virtual power plant. In such embodiments, module 121 uses converter 83 and/or converter 125 and bank 80 to provide services to grid 77. Such services are able to include load balancing, ancillary services such as voltage and frequency regulation, demand response, grid capacity reserve, energy arbitrage, and the like. In this case each charging station is able to be viewed as a distributed energy resource able to provide a positive impact on grid stability. If a vehicle is present at coupler 126 and/or coupler 127, module 121 is able to negotiate in accordance with predetermined rules embedded in software and in response to the charging data received from the attached vehicle or vehicles. This then allows the selective use of a given vehicle's onboard energy as part of the bidirectional resource.

In some embodiments, the first charging data, or the second charging data, includes data sent from the second communications module to the first communications module. Examples of such data includes: the state of charge of bank 80; the state of health of bank 80; the energy capacity of bank 80; the power conversion capability of converter 83; the present voltage of bank 80; the voltage limits of bank 80; the maximum current sinking of station 5; the maximum current or power able to be drawn by vehicle 1; the maximum energy able to be drawn by vehicle 1; any error states of station 5; and the like. In other embodiments, first charging data, or second charging data, is able to be sent from the first communications module to the second communications module. Examples of that data includes: the state of charge of pack 3; the state of health of pack 3; the energy capacity of pack 3; the maximum power conversion of controller 17 or other onboard controller; the maximum current requested for charging pack 3; the energy requested for charging pack 3; the current voltage of pack 3; the voltage limits of pack 3; the maximum voltage able to be applied to the coupler of vehicle 1; any error states of vehicle 1; and the like.

In other embodiments, more or less data is included in the first and second charging data.

In some embodiments the first and second charging data includes commands for controlling one or more functions of vehicle 1 from station 5, or controlling station 5 from vehicle 1. These commands are able to include analogue or digital control signals, such as for opening or closing switches possessed by either the vehicle or the charging station.

As with the other use of ordinal adjectives in this patent specification the use of 'first' and 'second' when referencing charging data does not imply an order or importance of the data, and nor does it necessarily represent the order or direction in which charging data is sent.

In some embodiments, first charging data is based on, or compatible with, existing charging communication standards such as those defined in private or public standards, or those commonly referred to as CCS, CHAdeMO, GB/T, Tesla, J1772, Type 2, OCPP, and the like.

Multiple charging stations 5 in a localised setting are able to offset each other's grid demand. Such stations are also able to define a micro-grid. In these configurations, banks 80 are able to be charged overnight and discharged behind-the-meter to provide some or all of the onsite demand for the micro-grid during day whilst vehicles are operating but not drawing charging current from the stations.

In a further embodiment, station 5 provides wireless power to car 1 through the use of an inductive loop, transducer, or any other method of wireless power transfer. In some embodiments, station 5 includes a DC to high frequency AC (HFAC) converter to supply the wireless power module. This DC-HFAC converter is able to be fed from converter 83, bank 80, or any other DC source. A controller for receiving and regulating the power onboard the vehicle in such an embodiment is illustrated in the Earlier application and is compatible with opportunity charging and the like. As previously detailed in this patent specification and the Earlier application, controller 17 is able to be used to regulate this externally received power whilst the vehicle is stopped, or whilst moving.

In one embodiment, car 1 makes use of a clutch as means of disconnecting the electric machine from the wheels whilst moving, for optimising charging from the wireless power source whilst operating in the second state.

In one embodiment, station 5 is coupled to a single or three-phase AC grid, and includes an interface that allows for rectification for supplying an unregulated or semi-regulated DC source to the car 1. In such embodiments, car 1 is responsible, through the use of controller 17, for controlling the charge current. In one embodiment, the rectification in station 5 is a passive rectification, where the load current drawn by car 1 is done so as to also provide power factor correction. In another embodiment, station 5 includes an interface for providing active rectification and/or power factor correction. In some embodiments, the rectifier included in station 5 is also able to invert power back its AC grid connection.

For controller 17 to facilitate a charge from an unregulated DC source such as station 5 in FIG. 3, additional hardware costs to car 1 are minimal, with only the addition of switch 48 being required. This is able to be achieved with an adequately rated contactor. Many modern electric vehicles have multiple contactors located throughout the HV wiring loom for safety purposes. In cases where multiple contactors exist, one contactor is able to be moved into the motor controller to act as switch 48 such that controller 17 is able to manipulate the contactor to control the motoring of the vehicle (the first state) or the charging of pack 3 (the second state), or any other mode of operation. In this way, the motor controller acts as a high power charger from an unregulated DC source, for negligible or no additional cost. In other embodiments, an additional voltage sensor is required in addition to switch 48, to provide feedback for controlling the DCDC conversion.

Figure 6:
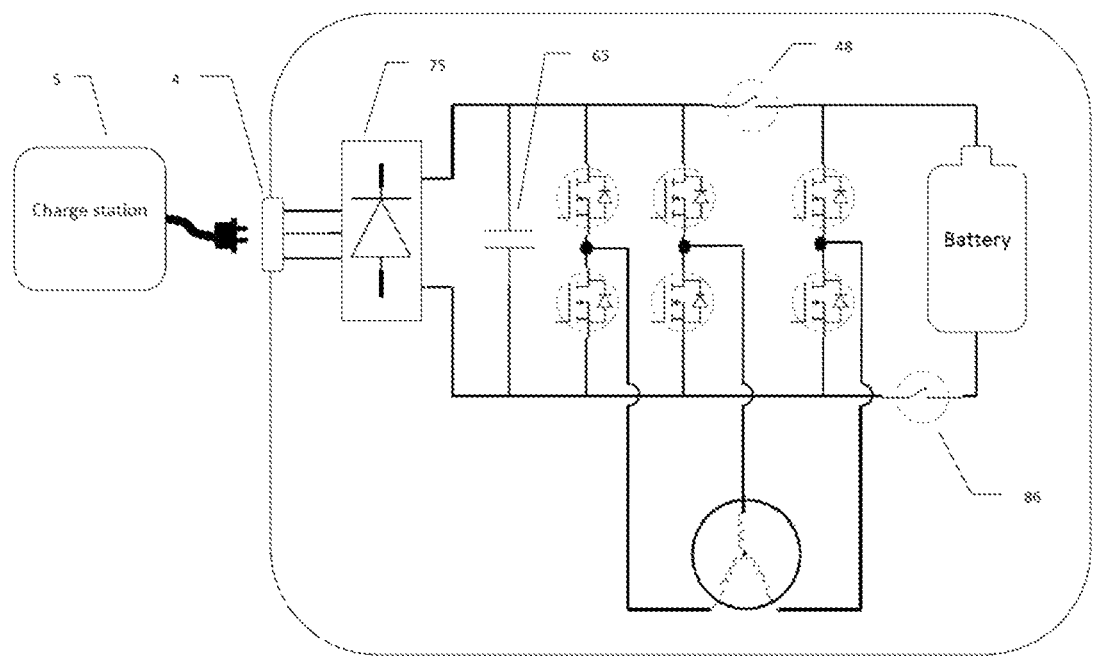
FIG. 6 illustrates an onboard high voltage (HV) wiring loom for an electric vehicle, according to an embodiment, for receiving AC or DC charging power from an external charging station.

High power motor controllers of modern electric vehicles require high decoupling/bulk capacitance on the DC bus bar to limit transient voltages caused by inductances and the switching of high current. For safety reasons, the motor controller of an electric vehicle is not energised when the vehicle is off, or not in active operation. Due to the low impedance of these capacitors, most modern electric vehicles have circuitry to prevent high inrush currents that would otherwise occur when the motor controller is first connected to the HV wiring loom. In some embodiments, the circuitry includes a resistor which is first switched into the circuit during the start up procedure, or a method of pulsing the current through use of a fast switching mechanism. The resistor is able to be switched out, or the pulsing stopped, once the capacitor reaches a sufficient voltage. This inrush current limiting circuit adds cost and complexity to the vehicle concerned, as well as adding to the overall weight of the vehicle and increasing space constraints. In some embodiments, such as shown in FIG. 6, a main decoupling/bulk capacitance 65 is connected to the second DC voltage side of the power rail interruption created by switch 48. In this case, controller 17 is able to operate in the second state, using the usual buck-boost operation, to charge the bulk capacitance 65 before closing the power rail interruption switch 48 and entering the first state. Similarly, controller 17 is able to pre-charge capacitor 65 before allowing a current to be drawn from station 5. In this way, the requirement for any external or additional inrush current limiter is eliminated for this embodiment. Similarly, it is considered unsafe for dangerous voltages to remain inside the motor controller of a modern electric vehicle once the vehicle is turned off, or in the event of an accident. Therefore, most modern electric vehicles have a method of discharging the bulk capacitance in the motor controller quickly in the event of shutdown or an emergency condition being detected. In some embodiments, controller 17 is employed to discharge the bulk capacitance 65 by entering the second state of operation and utilising buck-boost operation. The energy in the bulk capacitors is able to be either buck-boosted into pack 3, or discharged to a pulsed short circuit. This is achieved by making use of the motor inductance as a means of reducing current transients and protecting the drive circuits. In this way, car 1 is further simplified by eliminating the need for a dedicated discharge circuit or main contactor switch.

Some electric vehicles are designed to be able to accept AC or regulated DC from station 5 through port 4. To facilitate this input versatility with traditional components, known electric vehicles must include many high power switches to direct the input power to the appropriate component on the vehicle. For example, if the input power is AC, the prior art vehicle must direct the power to the on-board AC-DC charger converter, and must open any direct connection to either pole of the battery, requiring a minimum of two switches. If the input power is regulated DC, the prior art vehicle must open the connection to the AC-DC charger converter in case the DC voltage is too high for the AC-DC converter, and close both connections to the battery. During times when the vehicle is charging, in some prior art vehicles the motor controller is not energised for safety reasons, therefore another high power switch needs to be open, disconnecting the motor controller from the battery during charging. The high voltage (HV) wiring loom is further complicated by the addition of a pre-charge and discharging circuit. This means the HV loom in a prior art electric vehicle may require five or more high powered switches to control the flow of power. As shown in FIG. 5, the same functionality is able to be achieved in an embodiment of the invention by the simple addition of switch 86 on the negative DC rail and power rail interrupt switch 48. This allows both positive and negative poles of the pack 3 to be disconnected from charging station 5. An input circuit 75 containing a 3-phase rectifier is also included which converts an AC input voltage into a DC voltage, or simply allows a DC input voltage to pass through. This means station 5 is able to provide either single phase AC, 3-phase AC, regulated DC, or unregulated DC to charge port 4. In other embodiments, a further switch which is controlled in combination with switch 86 is implemented on the positive power rail between pack 3 and all of the drive circuits of controller 17. In other embodiments, switch 86 is implemented between input circuit 75 and capacitor 65. In further embodiments, disconnect high power switches are included on the input lines between input circuit 75 and charge port 4. In still further embodiments, multiple disconnect high power switches are included in the circuit. In some embodiments, input circuit 75 includes isolation circuitry such that pack 3 is electrically isolated from charge station 5.

In some embodiments, the input circuit includes an AC-DC converter topology with galvanic isolation such as a rectifier followed by an isolated LLC resonant DC-DC converter. In such cases, the isolation conversion is able to be optimised for efficiency without requiring a large output voltage range, as the charging current and/or charging voltage is modulated by controller 17.

In some embodiments, one of the key design parameters is to ensure electrical isolation during charging of an electric vehicle from grid 77. In such embodiments, without an isolated input circuit 75, using the power-train (that is controller 17 and/or machine 7) to facilitate the charge will not allow for isolation between the input power and onboard energy storage 3. Therefore, use is made of a separate AC-DC isolated converter for charging from a source with potential to earth, such as electrical grid 77.

Figure 7:
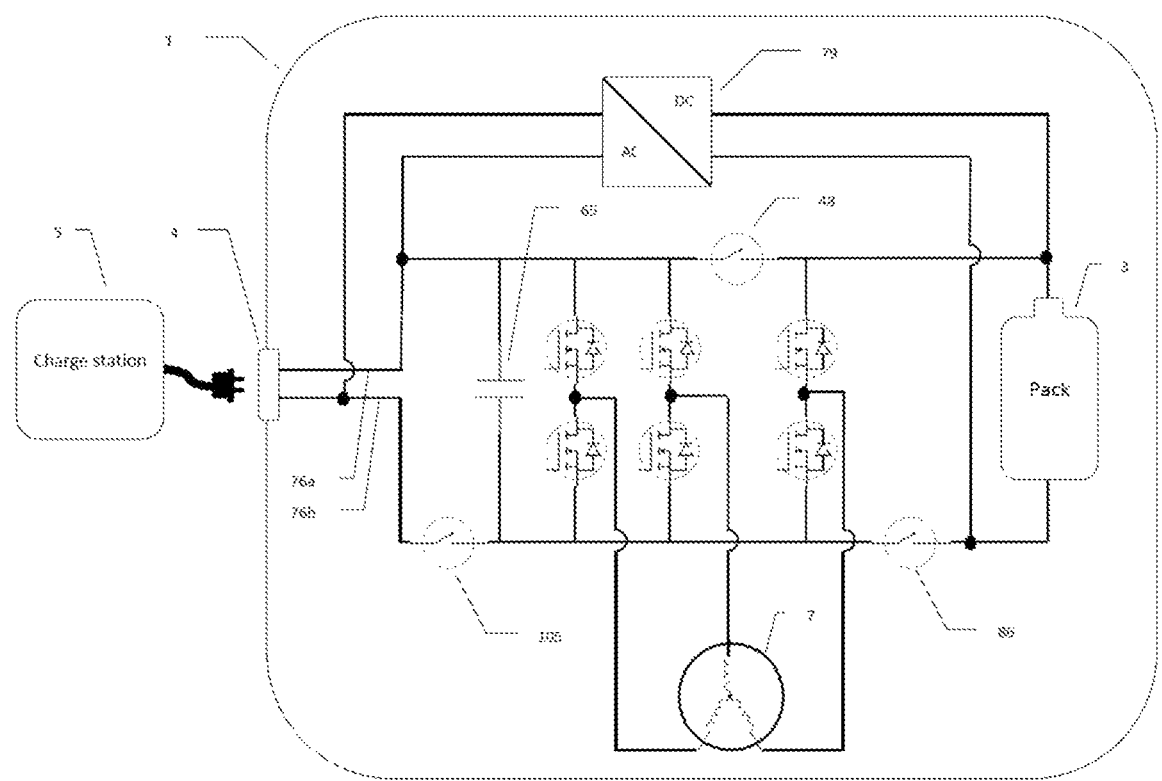
FIG. 7 schematically illustrates an onboard HV wiring loom for a vehicle according to another embodiment, where the loom receives isolated DC charging power, and un-isolated AC charging power, from the charging station.

Reference is now made to FIG. 7 where car 1 includes a dedicated AC-DC isolated charger 79, and controller 17, both of which are electrically connected to station 5, as required, via port 4 and input terminals 76. Controller 17 includes switches on the negative power rail in the form of switch 86 and 105. When station 5 includes a voltage source that is isolated from ground, such as through the use of an external AC-DC isolated converter, and/or an isolated external energy source 80, switches 86 and 105 close and controller 17 operates in the second state and is responsible for managing the charging of pack 3. In those embodiments where station 5 includes an AC source such as derived directly from grid 77, controller 17 opens switches 48, 86, and 105, and AC-DC converter 79 supplies a charging current for charging pack 3. In this way, capacitor 65 does not negatively impact upon AC input at port 4. What is more, capacitor 65 is able to be used as bulk capacitance for controller 17 whilst being able to be pre-charged using controller 17 in the second state. Capacitor 65 is also able to be pre-charged via switch 105 from a DC input at port 4 by employing a PWM pulse. In other embodiments, capacitor 65 is located on the same side of switch 48 as pack 3 (that is, at the first input source), and switch 105 is eliminated from the circuit. In further embodiments, two power rail interrupt switches 48, and 182, are present on the positive power rail in between the drive circuits, and capacitor 65 is located between the switches. In still further embodiments, a switch is employed on the positive power rail at the first or second input source power rail, in addition to, or instead of, any of the other switches in the circuit. In other embodiments, switch or switches are employed on the input or output of the isolated AC-DC converter 79. In further embodiments, switches are employed directly after port 4. In some embodiments, an input circuit is fitted which includes protection circuitry such as fuses. In further embodiments, car 1 includes multiple input ports, and the input of converter 79 and the second input of controller 17 are not coupled and connected to the different input ports instead.

In embodiments where station 5 is bidirectional, bank 80 or pack 3 are able to be used to charge and discharge to and from the external source. In the case where the external source is, or is derived from, an AC electrical grid network, bank 80 and pack 3 are able to charge from the electrical grid, and discharge to the electrical grid, based on utility demand response, at varying power levels. That is, when the source has a surplus of power, for example, due to an abundance of instantaneous renewable energy generation or the like, the flow of electrical energy is able to be controlled to absorb that energy at any specific rate up to the maximum power rate. When the source has a deficit of power, for example, due to a lack of instantaneous renewable energy generation or the like, the flow of energy is able to be controlled to supply energy to the source, at any power rating up to its maximum power rating, to aid in satisfying the demand for power. In such embodiments, controller 17 has direct communication with the connected electrical power network, or station 5, to identify periods when it should recharge, or discharge, its onboard energy source.

In other embodiments, controller 17 is issued commands from station 5 as to when to charge or discharge its onboard energy source. In further embodiments, controller 17 uses its voltage and/or current sensors, or other feedback devices, on the input circuit to sense for communication signals from the external electrical source to determine whether to charge or discharge the onboard energy source.

In further embodiments, module 121 receives and/or issues commands to converter 83 and/or converter 125, and/or controller 17, and/or any other controllers or converters to act in respective modes to either draw or supply current.

In all such embodiments as described directly above, the direction of energy flow, and the rate of charge or discharge (dictated by the power of the conversion), and the method to be employed for the conversion to take place, is managed by the controllers (e.g. controller 17 and/or controller 18 and/or converter 83 and/or converter 125, and/or any other controller or converter).

In some embodiments the commands issued by the relevant controller or controllers are derived or set directly by that controller or those controllers. Preferentially, those commands are communicated with station 5 and such that module 121 defines a supervisory controller.

In some embodiments, the onboard controller for the vehicle uses an algorithm to determine the direction of energy flow, the power of the energy conversion, the amount of energy to be converted, and any other relevant factors. In some embodiments, this algorithm has inputs and outputs which include one or more of communication with the external source or station 5, the state-of-charge (SoC) of the onboard storage 3, the charging and discharging power capability of the onboard storage 3, the power conversion capability of the circuits and/or motor and/or motors used by the controller in the conversion, previous driving and vehicle use habits, future vehicle use requirements, minimum onboard energy or vehicle range requirements, error events such as earth leakage detection or isolation fault, fault conditions, high voltage interlock loop, status of pantograph or charging receptacle, or the like. In some embodiments, the communication from station 5 includes the SoC of the external pack 80, available energy to source or sink, the charging and discharging capability of the external source, instantaneous renewable energy generation of the external source, earth leakage detection status, fault conditions, interlock loops, status of pantograph or other equipment, demand response with grid 77, issued commands, or the like.

In some embodiments, the communication between the station and vehicle is unidirectional.

In some embodiments, station 5 includes a method of detecting when an eligible vehicle is present so as to energise and present its terminals for interface with the vehicle.

In embodiments, station 5 is controlled by a master control unit, or a station module such as module 121 or other controller. In some embodiments, this master control unit is connected to one or more networks or communication modules including the internet, and is able to communicate with, for example; one or more electric vehicles including their locations and state of charge, a public transport operator or fleet manager for vehicle timetables or schedules, a weather forecast provider for prediction of renewable energy generation such as solar or wind and for predicting loads such as air-conditioning requirements, and the electricity network for spot and wholesale pricing and demand response cues. The master control unit uses this information to decide when to charge and discharge its energy capacity, and/or the energy capacity of any attached electric vehicles.

Although converter 79 and controller 17 are shown as discrete functional components, in other embodiments the two are implemented as a single integrated control module or control system. In further embodiments, use is made of an architecture including a supervisory module or supervisory controller (not shown) for controlling and coordinating the operation of both converter 79 and controller 17.

As detailed in the Earlier Application, controllers 17 and 18 are also able to be configured to operate in series to enable a two-stage charging process in which the voltage levels and charging power are able to differ. This includes, for example, fast charging of an onboard super capacitor bank, and slower charging of the main battery pack 3. This result is also able to be achieved in embodiments in which an intermediate voltage exists in the power rails between the first and second energy sources that are subject to control by a single controller or multiple controllers that are part of a supervisory controlled network. In particular embodiments, use is made of two power rail interruption switches. Further embodiments capable of creating an intermediate voltage include (but are not limited to) polyphase motors with two or more independently wound or connected phase windings, such as a six phase machine comprising of two independent 3-phase star or delta connected windings. In embodiments able to accommodate a two-stage charging process, other advantages to the system are possible. For example, the inclusion of a two-step conversion, in which a first buck and/or boost conversion acts to improve the power factor correction (PFC), EMI, or THD achieved for an AC (passive or active) rectified input. A second buck and/or boost conversion is then able to acts to condition the charge current. In this way, rectification hardware and/or software requirements of the AC input are able to be simplified and/or improved.

Figure 8:
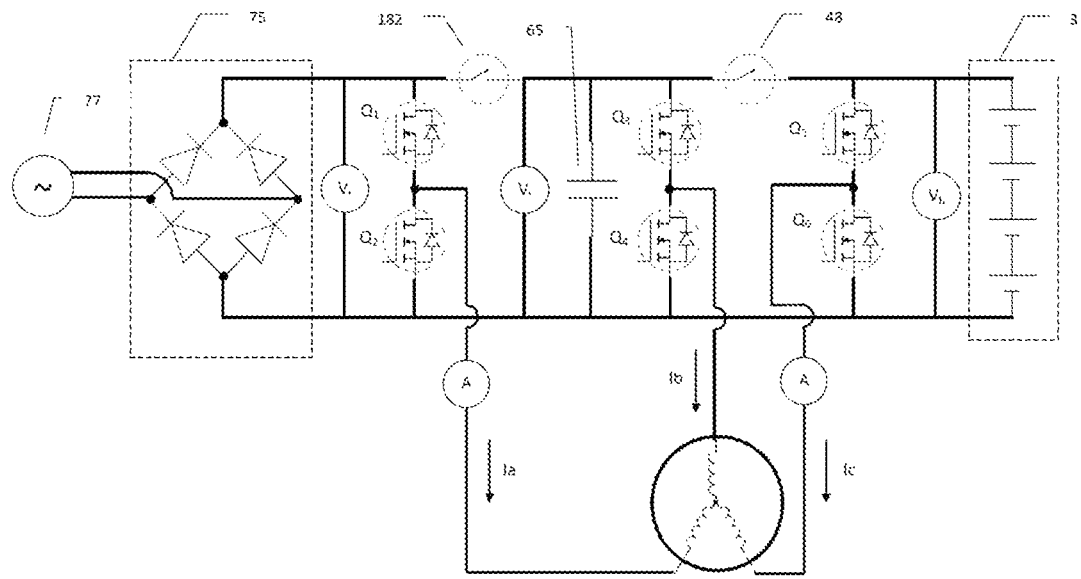
FIG. 8 is an electrical diagram of a controller for an electrical vehicle of another embodiment that provides onboard power factor correction.

Reference is now made to FIG. 8 where there is illustrated an example of a basic implementation enabling a two-stage charging process as used in an embodiment of the invention. In this embodiment, grid 77 is a single phase AC voltage, and controller 117 operates switches 48 and 182, along with the buck-boost switches, to allow grid 77 to charge the on-board pack 3 while maintaining a high power factor. More particularly, the single phase voltage provided by grid 77 is rectified through the passive input circuit 75 comprising of a full-bridge diode set. In one embodiment, to charge pack 3 from grid 77, controller 17 opens switches 48 and 182 to operate in the second state. To ensure a high power factor, controller 17 pulses buck switch $Q_1$, and boost switches $Q_4$ and/or $Q_6$ to control the current Ia in phase with the input voltage from grid 77. The charging current of pack 3, Ic needs to be DC (that is, constant, or at least relatively constant), and the AC rectified current Ia through Q1 needs to match the rectified sinusoid. Energy is stored in capacitor 65 as a buffer between these two requirements. In some embodiments, Ib will therefore take the form of a rectified (absolute value) sinusoid, inverted, with an offset of the required DC charging current Ic. When rectified Vin is low, and Ia needs to be proportionally low, the charging current Ic is supplemented by a discharge current from capacitor 65 (being current Ib). When Vin is high and Ia is able to be greater than the required charging current Ic, energy is stored in capacitor 65 through current Ib. For continuous operation, the charging current Ic should not exceed the desired RMS current of Ia. To get the current to flow where required, controller 17 utilises either buck or boost switches depending on the difference in voltages between Vr, Vi, and Vb. In some embodiments, capacitor 65 represents an ultra capacitor bank, and controller 17 operates such that capacitor 65 charges faster than battery pack 3. Capacitor 65 functions as the bulk capacitance of the controller when operating in the first state (that is, driving the motor), and is able to be pre-charged using either the first or second source when operating in the second state. In other embodiments, grid 77 is a three-phase grid, and input circuit 75 is a three-phase rectifier. In further embodiments, input circuit 75 is an active rectifier, either fully or half controlled. By using a two stage charging process, input circuit active rectification requirements can be reduced, eliminating significant cost from the system in terms of feedback sensors, control circuitry, gate drivers, and the like. In still further embodiments, AC from grid 77 is passively rectified external to the vehicle, such as in station 5, and controller 17 operates such that it provides power factor correction for the off-board rectification. In such embodiments, the nature of the external energy source, as well as any rectification or PFC requirements, are communicated between the first and second communication devices of the vehicle and charging station.

Figure 9:
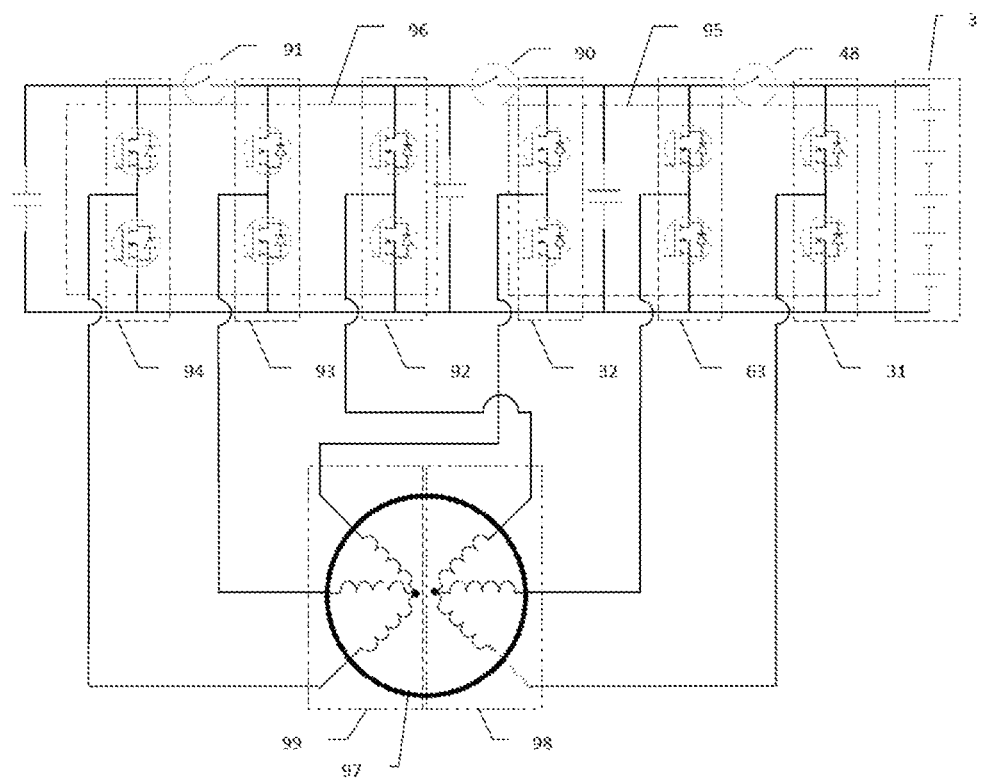
FIG. 9 is a schematic representation of another embodiment of a controller for an electric vehicle having an electric machine with multiple winding sets.

Reference is now made to FIG. 9 where corresponding features are noted by corresponding reference numerals. In this embodiment, a machine 97 is a six phase machine with two independent sets of 3-phase windings 98 and 99. Each set of windings is driven by three drive circuits, to give a total of six drive circuits. In some embodiments, controller 17 consists of all six drive circuits to control the operation of machine 97. In other embodiments, controller 17 and controller 18, each with three drive circuits, act independently, or under the supervisory control of controller 15, to control the operation of machine 97. Three of the drive circuits together form a 3-phase inverter switching array module (sometimes referred to as a six pack), will be referred to in this specification as an array. In the embodiment illustrated, array 95 is comprised of drive circuits 31, 63, and 32, whilst array 96 is comprised of drive circuits 92, 93, and 94. In the embodiment shown, three power rail interruption switches 48, 90, and 91, are disposed between the drive circuits 31 and 63, 32 and 92, and 93 and 94 respectively. In the illustrated embodiment, one of the machine phase tails from each set of independent windings is driven by at least one drive circuit in each array. That is, in the embodiment illustrated, a winding set 98 is driven by drive circuits 31, 63, and 92, and a winding set 99 is driven by drive circuits 32, 93, and 94. In this way, only switch 90 is required to be opened in the second state for a voltage translation to occur, using either one, or both, sets of windings in parallel. Therefore, in some embodiments, only switch 90 is implemented as a means of interrupting the power rail and entering the second state. Such an embodiment has the advantage that arrays are able to be sourced which have internally fused/connected positive and negative power rail connections, allowing for a wider range of selection of components during the design and implementation of such a controller. In the embodiment illustrated, if controller 17, or supervisory controller 15, opens switches 90, and/or 91, and/or 48 in the second state, a multi-stage voltage translation is able to occur in series and/or parallel. In this way, the charging cycle is able to be optimised for efficiency, THD, EMI, switching frequency, charging power, PFC, or the like. For example, in one embodiment, when placed in series, the converter is able to increase the effective inductance of the conversion, and whilst in parallel, the converter can reduce the effective inductance. As detailed earlier, controller 17, or controller 15 is able to act such that torque generated by one set of windings in the second state is able to be wholly or substantially cancelled by the other winding set. In one embodiment, switch 48 is opened such that drive circuits 32, 93, and 94 are operated in the first state, whilst drive circuits 31, 63, and 92 operate in the second state. In such embodiments, winding set 99 is able to be used for providing tractive effort for car 1 powered by a DC input from station 5, or for manipulating the rotor position during the charge cycle involving winding set 98. In another embodiment switch 91 is opened such that winding set 98 is operated in the first state whilst winding set 99 is operated in the second state. In other embodiments, other features previously mentioned in this patent specification and in the Earlier application for machines with multiple sets of windings, or machines with locked or linked rotors are able to be utilised. In further embodiments, other components are implemented in the circuit such as supercapacitors, rectifiers, input circuits, MERS, and the like, as previously outlined in this specification, and the Earlier Application. In still further embodiments, other switches and/or configurations and/or algorithms and/or features for the first and second state are used. In other embodiments, each set of independent windings are driven only from one array, and switch 90 is used to electrically isolate at least one power rail of one array from the other. This may be advantageous, for example, in the event of a failure of one of the drive circuits, arrays, or winding sets, which would otherwise impose a failure on the other set if it were not isolated. In such cases, for a voltage translation to occur over switch 90, a separate buck-boost inductor is required to be implemented in between at least one drive circuit of one array, and at least one drive circuit of the other array. This separate inductor is able to be switched in and out of the circuit, depending on if the controller is operating in the first or second state, by use of further isolation switches on one or both sides of the separate inductor. In a further embodiment, two or more drive circuits are used for rectification, whilst two or more other drive circuits are operated in the second state. In further embodiments, machine 97 has other than six phases, and/or other than two independent sets of windings. An example of which is a machine with 9-phases, including nine drive circuits derived from three 3-phase arrays where voltage translation occur using any combination of the three sets of windings. In one such embodiment with three sets of independent windings, one winding from each winding set is connected to the first array 95 such that all three winding sets can be used in parallel for producing the charging current.

Reference is now made to FIG. 10 where there is illustrated a 9-phase electrical machine with three sets of independent windings. In the embodiment shown, an unregulated DC source is able to be connected to the second input, and controller 17 is able to operate in the second state through the use of switches 48 and/or 182, such that controller 17 is able to apply a regulated charging current or charging voltage to the first input. Alternatively, or at the same time, an AC source represented by grid 77 is able to be applied to third input terminals 201, 202 and/or 203, and rectified by array 103 to provide a DC voltage at the power rails of array 103, and/or the second input. When a source is applied to the third input, controller 17 is able to disconnect the phases of the motor from array 103 where the third input is applied. For example, if a single phase AC source is presented at the third input through input terminals 201 and 202, controller 17 issues signals to open switches 100 and 101 such that the input is disconnected from the motor phase windings of 97*c*. The drive circuits of array 103 are then able to operate such that the input AC source is actively rectified with power factor correction. Similarly, if a three-phase source is applied to the third input, switches 100, 101 and 102 are opened such that the three-phase input is disconnected from the motor phases. In other embodiments, all three drive circuits of array 103 are connected to winding set 97*c*, and as such only one or two of the three drive circuits need to be disconnected from the motor windings when an source is applied at the third input. In some embodiments, some or all of the drive circuits of array 103 form part of input circuit 75.

In some embodiments, a filter is incorporated in an input circuit on the vehicle at the third input to reduce total harmonic distortion, EMI, and/or other undesirable traits. In some embodiments, this filter acts as a common mode filter for terminals 201, 202 and 203. In other embodiments, a filter is implemented on the infrastructure side in station 5. In further embodiments, boost inductors are fitted in the input circuit such that array 103 forms part of a boost rectifier.

In the illustrated embodiment, once a voltage is present at the second input, either from an applied external DC source, or as derived from the third input, controller 17 is able to operate in the second state to apply a charging current or voltage to the first input. Controller 17 is also able to operate in the first state by drawing current from either the first or second input, or a combination of the two. In some embodiments, controller 17 is able to operate both in the first state and the second state concurrently. As all windings sets in the present embodiment have at least one winding connected to array 95, controller 17 is able to operate in the second state using only switch 48, and motor winding sets 97*a*, 97*b*, and 97*c* are able to operate in parallel. Alternatively, controller 17 is able to operate in the second state with both switch 48 and 182 open, and therefore provide a series conversion, or a combination of series and parallel conversions. Controller 17 is able to operate such that switch 48 and or switch 182 are pulsed such that a hybrid operation exists. That is, controller 17 is able to operate in any way such that it optimises the applied charging current or voltage applied to the first input based on efficiency, THD, PFC, ripple, noise, machine torque, rotor position, or any other parameter. Bulk capacitance of array 103 is able to be pre-charged by controller 17 acting in the second state via the first input such that an inrush current does not occur when a source is applied to the second or third inputs. Similarly, other capacitances are able to be pre-charged and discharged as required.

In other embodiments, machine windings are connected to the drive circuits of the array modules 95, 96, and 103 in other configurations such that controller 17 is able to operate in other modes optimal to the input types and required application.

In a further embodiment, machine 97 has other than 3 sets of independent windings, and/or controller 17 has other than three sets of 3-phase array modules.

In other embodiments, rectification is not required and the third input and switches 100, 101, and 102 are eliminated. In further embodiments, array 103 is not connected to an electrical machine winding set, and/or another array configuration is used which is optimised for rectification, such as a Vienna rectifier. In still further embodiments, multiple electrical machines are used in place of independent motor windings, to a similar effect.

Figure 16:
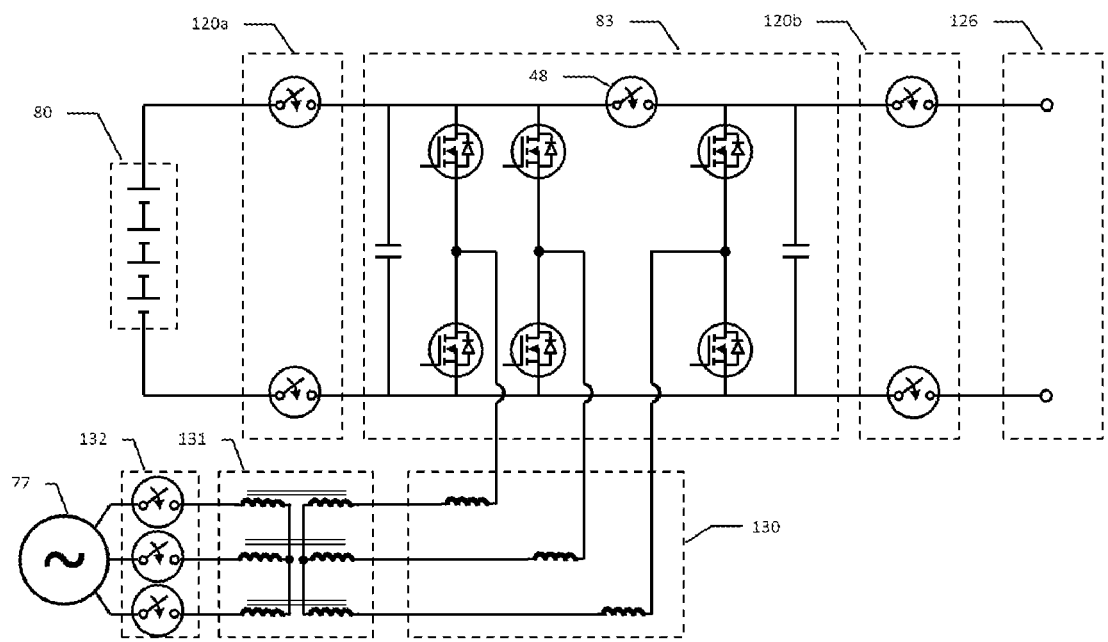
FIG. 16 is a schematic illustration of an electric vehicle charging station making use of a grid transformer to provide voltage and/or current regulation.

Reference is now made to FIG. 16, where corresponding features are denoted by corresponding reference numerals. FIG. 16 is an illustration of another embodiment of the invention which allows station 5 to provide a regulated charge to an electric vehicle at coupler 126 where energy is supplied from bank 80 and regulated by converter 83. In this embodiment, converter 83 comprises a controller circuit including a switching mechanism 48 similar to that of controller 17 in the prior application, wherein the inductive load is a 3-phase galvanically isolated transformer 131 connected to grid 77. This embodiment also includes an input circuit 130 having further series inductances. In other embodiments, input circuit 130 is not present, or includes other elements including but not limited to an input or output filter, disconnect or safety switches or mechanisms, protection circuitry, fusing, or the like, in addition to or instead of the illustrated series inductors. In other embodiments, transformer 131 is not galvanically isolated.

In the present embodiment, station 5 also includes a grid isolation circuit 132, a switching mechanism 48 (which is part of converter 83), an energy storage isolation circuit 120a (which is part of controller 120), electric vehicle coupler 126, output circuit 120b (which is part of controller 120), control module 121, and communication module 122. In other embodiments, different components are used in addition to or instead of the above described components.

In other embodiments, station 5 does not include a transformer and interfaces directly to grid 77, or through an external transformer. In the present embodiment, module 121 (not shown) issues commands to converter 83, and/or switch 48, and/or the controller 120 for energy storage device isolator circuit 120a, and/or coupler isolation circuit 120b, to perform the required modes of operation.

In a first mode of operation, station 5 draws energy from grid 77 via transformer 131, and supplies at least one of a regulated charging current or a regulated charging voltage to vehicle 1 when coupled at coupler 126. In one operational method of the first mode, converter 83 acts as a boost rectifier using the inductive coils of transformer 131 and/or any series inductors contained in input circuit 130. In this mode, controller 120 uses the energy storage isolation circuit (illustrated as 120a, a subset of controller 120) partially or fully disconnects energy storage device 80 from converter 83.

In a second mode of operation, converter 83 similarly acts as a boost rectifier to supply either one of a regulated charging current or regulated charging voltage to bank 80, with controller 120 partially or fully connecting bank 80 to converter 83 through the circuit illustrated as 120a.

In a third mode of operation, station 5 provides an unregulated DC voltage to vehicle 1 at coupler 126. That is, station 5 does not provide a fully regulated charging voltage or current to vehicle 1. In the present embodiment, this is achieved by closing switch 48, and controller 120 enabling partial or full connection of bank 80 through the energy storage isolator circuit illustrated as 120a, and partial or full connection of coupler 126 via the coupler isolation circuit illustrated as 120b (another subset of controller 120). In this mode, the unregulated voltage at coupler 126 is related to, or fixed at, the floating voltage of bank 80, and/or the boost rectified voltage of grid 77 through the turns ratio of transformer 131. In this mode, the vehicle coupled at coupler 126 is able to draw a current from charging station 5 to perform its own onboard regulation. Converter 83 is able to supply or draw current during this mode depending on the operation of module 121 (not shown). Circuit 132 is able to partially or fully isolate the grid from transformer 131. In the case where grid 77 is fully isolated from station 5, all of the current drawn from station 5 by vehicle 1 at coupler 126 is supplied from bank 80 and/or additional power sources such as array 84 (not shown in this embodiment but exemplarily illustrated in FIG. 3). If grid 77 is not fully isolated from station 5, then converter 83 is able to provide current to either vehicle 1 at coupler 126, or bank 80.

Therefore, the first, second, and third modes in this embodiment are not temporally mutually exclusive, and any of these modes or combination of modes are able to be fully or partially enacted simultaneously, sequentially, or in an overlapping manner.

A given one of these modes or combination of these modes is able to result in a semi-regulated voltage or current being applied to vehicle 1 at coupler 126. As noted above, in this specification that is classified as being an unregulated supply.

In a fourth mode of operation converter 83 draws upon energy from bank 80 to provide energy or services to grid 77 via transformer 131. In this mode, switch 48 is closed, controller 120 fully or partially connects bank 80 to converter 83 via energy storage isolated circuit 120a and converter 83 acts as an inverter to draw energy from bank 80 to provide energy to grid 77.

In a fifth mode of operation, station 5 draws energy from the battery pack 3 of vehicle 1 connected via coupler 126. In this mode, switch 48 is closed, controller 120 fully or partially connects vehicle 1 to converter 83 via coupler isolation circuit 120b, and converter 83 acts as an inverter to draw energy from vehicle 1 to supply energy back to grid 77.

The fourth and fifth modes of operation are not mutually exclusive, and energy is able to be drawn from both bank 80 and vehicle 1 simultaneously to supply energy to grid 77.

The first, second, third, fourth, and fifth modes are not necessarily mutually exclusive, although not all combinations are simultaneously available. For example, station 5 is able to supply energy to either bank 80 and/or vehicle 1, whilst at the same time supplying energy to grid 77. For another example, in the instance where module 121 (not shown) operates station 5 in the fourth mode, it is also able to operate in the third or fifth modes.

In a sixth mode of operation, converter 83 acts to draw current from bank 80 and supply either a regulated charging current or a regulated charging voltage to vehicle 1 at coupler 126.

In a seventh mode, converter 83 is able to draw energy from an attached vehicle at coupler 126 to supply at least one of a regulated charging voltage or a regulated charging current to bank 80.

In the sixth and seventh modes, switch 48 is open such that converter 83 uses the inductance of the windings of transformer 131, and/or any inductance of the input circuit 130, as buck-boost inductance for a DC-DC conversion. In the sixth and seventh modes, converter 83 acts as a bidirectional cascaded non-inverting buck-boost converter. That is, transformer 131 defines an inductive load and switch 48 provides the required break in the power rail of the drive-circuits within converter 83 to control the transfer of energy to and from the first and second inputs. That is, the operation of converter 83 is broadly analogous to controller 17 in car 1 of FIG. 1.

In the sixth and seventh modes circuit 132 is able to act to partially or fully isolate grid 77 from transformer 131 such that the coupling of the primary and secondary windings of transformer 131 have minimal or no effect on the DC-DC conversion characteristics of converter 83.

In the first, second, third, fourth and fifth modes of operation, converter 83 behaves similarly to controller 17 (as exemplarily illustrated in FIG. 2) operating in the first state, with switch 48 closed. In the sixth and seventh modes, controller 83 behaves similarly to controller 17 in the second state with switch 48 open.

In another embodiment, another energy source in addition to, or instead of grid 77, is used. This other energy source is able to be a photovoltaic panel or array, wind turbine, or other energy source. In some embodiments, converter 83 acts as the primary converter or controller for the other source, and in other embodiments a dedicated converter, such as a charge converter or MPPT controller may be added.

In some embodiments, bank 80 is an energy storage or generation device such as a renewable energy resource such as a solar panel array. If bank 80 is unidirectional, station 5 does not operate in the second mode.

In other embodiments or modes, converter 83 acts as a buck or boost or buck-boost converter and may comprise of a different electrical topology.

In most embodiments, controller 17 is responsive to communication with charging station 5 for the operation and optimisation of producing or suppling a charge current.

In other embodiments, a vehicle includes:
a body;
a DC energy source mounted to the body;
a port mounted to the body for connecting with an external energy source;
at least one electric motor mounted to the body for providing locomotive energy to the vehicle, wherein the motor has one or more inductive windings;
at least two drive circuits, wherein each drive circuit includes a power rail from which DC current is selectively drawn by the respective drive circuit to energise at least one of the one or more windings; and
a switching device for operating in a first state and a second state wherein, in the first state, the switching device connects the power rails to the DC energy source and, in the second state, the switching device isolates at least one of the power rails from at least one other of the power rails and connects the at least one of the power rails to a second DC energy source that is derived from the external energy source.

In other embodiments, the controller is for an electric machine having one or more inductive windings, and the controller includes:
at least two drive circuits, wherein each drive circuit includes a power rail from which DC current is selectively drawn by the drive circuit to energise at least one of the one or more windings; and
a switching device for operating in a first state and a second state wherein, in the first state, the switching device connects the power rails to a common DC energy source that operates at a first DC voltage and, in the second state, the switching device isolates at least one of the power rails from at least one other of the power rails such that the at least one of the power rails is able to operate at a second DC voltage.

In light of the above description it will be appreciated that an embodiment provides a vehicle including:
a body;
a first DC energy storage device mounted to the body;
a first pair of terminals mounted to the body for electrically connecting with a second pair of complementary terminals of a vehicle charging station, wherein the vehicle charging station includes a second DC energy storage device that provides to the second pair of terminals an unregulated DC voltage;
an electric machine mounted to the body, wherein the machine draws a drive current from the first DC energy storage device for providing locomotive energy to the vehicle;
a first communications module, wherein the vehicle charging station includes a second communications module for communicating first charging data to the first module; and
an onboard controller that is responsive to the first charging data for allowing, when the first and second pair of terminals are electrically coupled, a load current to be drawn from the second energy storage device, wherein the load current allows for the generation of at least one of a regulated charging current or a regulated charging voltage for the first DC energy storage device.

It will also be appreciated that an embodiment provides a vehicle charging station for an electric vehicle, wherein the electric vehicle has a body, a first DC energy storage device mounted to the body, a first pair of terminals mounted to the body, an electric machine mounted to the body that draws a drive current from the first DC energy storage device for providing locomotive energy to the vehicle, a first communications module and an onboard controller for controlling the drive current and providing at least one of a regulated charging current or a regulated charging voltage to the first DC energy storage device, and wherein the vehicle charging station includes:
a second pair of terminals for being complementarily electrically coupled with the first pair of terminals; and
a second communications module for communicating first charging data to the first communications module; and
a second DC energy storage device that, after communication of the first charging data, provides to the second pair of terminals an unregulated DC voltage such that, when the first and the second pair of terminals are coupled, a load current is drawn from the second DC energy storage device and supplied to the first terminals for use by the onboard controller to generate at least one of the regulated charging current and the regulated charging voltage.

An embodiment also provides a vehicle including:
a body;
a first DC energy storage device mounted to the body;

a first coupler mounted to the body for coupling with a second complementary coupler of a vehicle charging station to allow energy transfer to the first coupler, wherein the vehicle charging station includes a second DC energy storage device that provides to the second coupler an unregulated DC voltage;

an electric machine mounted to the body, wherein the machine draws a drive current from the first DC energy storage device for providing locomotive energy to the vehicle;

a first communications module, wherein the vehicle charging station includes a second communications module for communicating first charging data to the first module; and an onboard controller that is responsive to the first charging data for allowing, when the first and second couplers are coupled, a load current to be drawn from the second energy storage device, wherein the load current allows for the generation of at least one of a regulated charging current or a regulated charging voltage for the first DC energy storage device.

An embodiment also includes a vehicle charging station for an electric vehicle, wherein the electric vehicle has a body, a first DC energy storage device mounted to the body, a first coupler mounted to the body, an electric machine mounted to the body that draws a drive current from the first DC energy storage device for providing locomotive energy to the vehicle, a first communications module and an onboard controller for controlling the drive current and providing at least one of a regulated charging current or a regulated charging voltage to the first DC energy storage device, and wherein the vehicle charging station includes:

a second coupler for being complementarily coupled with the first coupler for allowing transfer of energy to the first coupler; and a second communications module for communicating first charging data to the first communications module; and a second DC energy storage device that, after communication of the first charging data, provides to the second coupler an unregulated DC voltage such that, when the first and the second couplers are coupled, a load current is able to be drawn from the second DC energy storage device to thereby allow the onboard controller to generate at least one of the regulated charging current and the regulated charging voltage.

An embodiment also includes a method of operating a vehicle charging station for an electric vehicle, wherein the electric vehicle has a body, a first DC energy storage device mounted to the body, a first coupler mounted to the body, an electric machine mounted to the body that draws a drive current from the first DC energy storage device for providing locomotive energy to the vehicle, a first communications module and an onboard controller for controlling the drive current and providing at least one of a regulated charging current or a regulated charging voltage to the first DC energy storage device, and wherein the method includes the steps of:

complementarily coupling the first coupler with a second coupler of the vehicle charging station for allowing energy to be transferred to the first coupler;

communicating first charging data from the station to the first communications module using a second communications module; and a second DC energy storage device that, after communication of the first charging data, provides to the second coupler an unregulated DC voltage such that, when the first and the second couplers are coupled, a load current is drawn from the second DC energy storage device and the energy transferred to the first coupler for use by the onboard controller to generate at least one of the regulated charging current and the regulated charging voltage.

An embodiment also includes a vehicle including:

a body;

a DC energy source mounted to the body;

a connector mounted to the body for connecting with an external energy source;

an electric machine mounted to the body for providing locomotive energy to the vehicle, wherein the or each machine has a stator, a rotor mounted to the stator for rotation, and one or more windings; and a controller for operating in a first state and a second state wherein, in the first state, the controller allows current to be drawn from the DC energy source for energising at least one of the one or more windings such that the electric machine provides the locomotive energy and, in the second state, the controller controls the position of the rotor relative to the stator and allows at least one of the one or more windings to be energised to provide a charging current to the DC energy source.

The main advantages of offered by one or more of the embodiments described above include:

The ability to charge a battery pack for an electric vehicle from wide range of inputs, including an unregulated DC source, regulated DC source, a single phase AC source, and a three phase AC source.

Providing buck functionality (where the external source voltage is higher than the present battery voltage) and/or boost functionality (where the external source voltage is lower than the present battery voltage) and any combination of the two.

Bidirectional DC power flow is enabled between the onboard battery pack and a DC energy storage device, with buck and boost functionality available in both directions.

Needing minimal extra components above that already required to operate and drive the motor or motors, which provides not only cost savings but also reduces the overall weight of the electric vehicle.

Simplifying the recharging infrastructure such that an external charging current regulator is not required to be employed externally to the vehicle Simplifies high voltage (HV) and low voltage (LV) wiring looms by eliminating components and making existing components (motor controller) perform multiple functions (motor controller, charger, pre-charge and discharge).

Allows the use of three phase grid AC power to reduce charging times to a period comparable with Level 3 DC fast charging.

Enables universal deployment by offering buck, boost and buck-boost functionality.

Accommodates a variety of input voltages and types, including typical electrical grid infrastructure voltages such as 110 V, 240 V, 415 V three phase, HVDC, and others.

Ability to make use of existing infrastructure such as overhead conduction wires for a tram, train, trolley bus, or the like.

Ability to simultaneously drive and charge whilst coupled to an external energy source Ability to make use of existing stationary storage infrastructure as electric vehicle charging infrastructure with minimal extra requirements Allows a charging station to enable charging of multiple vehicles in parallel without significantly increasing the cost Ability to use renewable energy, such as produced by solar PV array, or wind turbine, directly to recharge a vehicle with minimal extra requirements Ability to improve grid load management and stability, through the use of demand response.

Bidirectional capability allows for vehicle-to-grid, vehicle-to-vehicle, vehicle-to-home, and V2X support.

Operate efficiently, and without the addition of large or costly components such as dedicated buck/boost inductors.

Ability to fine tune charging efficiency, EMI, THD, and power factor through the use of varying inductance paths, motor saliency, switching frequency, duty cycle, buck-boost cycles, switching patterns, and the like Ability to implement a rotor locking mechanism or torque algorithm to control the angle and rotational velocity of the rotor to improve charging efficiency, EMI, THD or power factor.

When coupled with an inverter/rectifier, the input/output becomes a versatile AC input or output, or polarity independent DC input or output.

Allows for varying levels of inductance in voltage translations. That is, use is able to be advantageously made of one or all of the windings to implement the DC-DC translation.

Allows for an increase in the rate of energy transfer.

Allows for an increase in bidirectional power capability between an onboard energy source (such as an onboard battery), and an external energy source (such as the electrical power grid).

Increases the efficiency of the charging operation.

Allows for the reduction of the ripple in the DC charging current.

Reduces the complexity of the overall circuitry required for an electric vehicle. The small increase in complexity to the controller is offset by the elimination of the need for separate charging circuitry as the same circuits used to drive the motor are used to charge the batteries.

Simplifies input circuits for AC input power factor correction by allowing passive, or half or fully controlled active rectifiers of various types to be used.

Reduces complexity of external charging infrastructure, by allowing the vehicle to charge from an unregulated DC source (such as an external battery or solar panel), a regulated DC source (such as a Level 3 DC charger), or an AC source (such as a single or 3-phase supply).

Improves the value proposition of electric vehicle recharging infrastructure by reducing capital requirements, while increasing the output power capability and therefore return on investment through the sale of electricity.

Makes electric vehicle charging infrastructure future proof by allowing the vehicle to manage the charging current that is specific to its own requirements Allows for greater charging versatility Allows vehicles to charge anywhere there is access to power through use of onboard charging converter Improves interoperability between electric vehicle charging stations as communication is standardised and/or simplified, and vehicles are responsible to manage their own charging current Applicable to a broad range of motors and electrical machines, including DC motors, single-phase AC motors, multi-phase motors (such as induction motors, asynchronous motors, and permanent magnet synchronous motors), switched reluctance motors, and others.

When used in independently coiled motors (such as switched reluctance motors) the embodiments are able to be advantageously operated to selectively place the windings in parallel or series.

When used for motors with independent sets of phases (for instance, two 3-phase windings), the embodiments are able to advantageously manipulate motor inductance of the coils in series or parallel.

When used for motors with independent sets of phases (for instance, two 3-phase windings), the embodiments are able to advantageously cancel out any torque creating current during the second state of operation When used for multiple motors with linked rotors, or with rotors with multiple stator winding sets, the embodiments are able to manipulate the rotor position whilst charging in order to tune the charging cycle using the saliency of the motor.

When used in vehicles with rotor locking mechanisms such as a clutch, park brake, or parking pawl, the embodiments are able to lock the rotor in a desirable position, or manipulate the position or angular velocity of the rotor, to improving the charging cycle.

When used in vehicles with motors able to freely rotate in the second state, such as through the use of a clutch, torsional compliant driveline, or stand for electric scooter or motorcycle, the motor is able to self-align, and/or be aligned in a beneficial position.

Allows the charge/discharge of other energy storage devices at different voltage levels. That is, it is compatible with supercapacitors, PFC, MERS and the like.

Allows for multiple voltage inputs and outputs, including voltage outputs independent the input voltage and the battery voltage. This is enabled by allowing for more than one separation between the power rails of the drive circuits.

The applicability to electric motors which do not drive each winding independently. That is, embodiments are applicable to single-phase or DC motors, and to 3+ phase motors where each phase is linked together in a star or delta configuration.

Avoiding the need for asymmetrical half-bridges in the drive circuits.

Applicable to multiple motor configurations, and able to be implemented in series and/or parallel.

Ability to make use of current infrastructure such as overhead transmission wires, or the like for trains, trams, trolley buses, or the like, without the requirement of any infrastructure modifications Able to make use of opportunity charging using infrastructure such as overhead transmission wires, wireless power transmitters, pantographs, automated charging robot arms, or the like.

Ability to generate income from the charging station by providing grid services such as voltage and frequency regulation, demand response, energy capacity reserve, energy arbitrage, and the like.

Economical for new ownership business models for the charging infrastructure with the ability for the charging station to generate a return on investment Ability for the charging station to be used to charge prior art vehicles Ability for the electric vehicle to be charged from prior art regulated DC charging stations.

Reduces the upfront capital expenditure cost of the charging infrastructure compared with a comparable power prior art charging station Reduces the operational expenditure of the charging station compared with prior art charging stations by reducing peak demand charges, enabling easy integration of renewables, and allowing for load shifting to make use of lower electricity prices Reduces the size of the electric vehicle charging station compared with comparable output power prior art charging stations Reduces the installation cost of the electric vehicle charging station by reducing its size and weight Ability for multiple vehicles to simultaneously charge from the one charging station Ability to buffer electrical grid demand while charging electric vehicles Can reduce the installation cost of the electric vehicle charging station by reducing the likelihood of network infrastructure upgrades to support the peak demand of the charger.

Reference in the above embodiments to control signals is to all signals that are generated by a first component and to which a second component is responsive to undertake a predetermined operation, to change to a predetermined state, or to otherwise be controlled. The control signals are typically electrical signals although in some embodiments they include other signals such as optical signals, thermal signals, audible signals and the like. The control signals are in some instances digital signals, and in others analogue signals. The control signals need not all be of the same nature, and the first component is able to issue different control signals in different formats to different second components, or to the same second components. Moreover, a control signal is able to be sent to the second component indirectly, or to progress through a variety of transformations before being received by the second component.

The terms "controller", "converter", "module" and the like are used in this specification in a generic sense, unless the context clearly requires otherwise. When used in a generic sense, these terms are typically interchangeable.

It will be appreciated that the disclosure above provides various significant improvements in a controller for an electric machine having one or more inductive windings.

It should be appreciated that in the above description of exemplary embodiments of the invention, various features of the invention are sometimes grouped together in a single embodiment, Figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Similarly, references to Controller 17 are equally valid for other controllers, or a combination of controllers, as listed in this patent specification and the Previous application.

In the description provided herein numerous specific details are set forth. However, it is understood that embodiments of the invention may be practiced without these specific details. In other instances, well-known methods, structures and techniques have not been shown in detail in order not to obscure an understanding of this description.

Similarly, it is to be noticed that the term "coupled" or "connected", when used in the description and claims, should not be interpreted as being limited to direct connections only. The terms "coupled" and "connected," along with their derivatives, may be used. It should be understood, for example, that the terms "coupled" and "directly coupled" are not intended as synonyms for each other. Thus, the scope of the expression "a device A connected to a device B" should not be limited to devices or systems wherein an output of device A is directly connected to an input of device B. Rather, it means that there exists a path between an output of A and an input of B which may be a path including other devices or means. "Connected" may mean that two or more elements are either in direct physical or electrical contact, or that two or more elements are not in direct contact with each other but yet still co-operate or interact with each other. Similar terms are also interpreted similarly. By way of example, the terms "mounted to" or "fixed to" should not be limited to devices wherein a first element is mounted directly to or fixed directly to a second element. Rather, it means that there exists a mounting of fixing between the two that is able to, but does not have to, include intermediate elements.

Thus, while there has been described what are believed to be the preferred embodiments of the invention, those skilled in the art will recognize that other and further modifications may be made thereto without departing from the spirit of the invention, and it is intended to claim all such changes and modifications as falling within the scope of the invention. For example, any formulas or flowcharts provided are merely representative of procedures that may be used. Functionality may be added or deleted from the block diagrams and operations may be interchanged among functional blocks. Steps may be added or deleted to methods described within the scope of the present invention.

The invention claimed is:

1. A charging station for an electric vehicle, wherein the electric vehicle has a body, a first coupler mounted to the body, and a first communications module, and wherein the charging station includes:

a second coupler for releasably and complementarily coupling with the first coupler for allowing a transfer of energy from the second coupler to the first coupler at a coupler voltage and a coupler current;

a second communications module for communicating first charging data with the first communications module;

an interface for connecting with an external source of electrical energy;

a control module for providing control signals; and a switching module that is responsive to the control signals for selectively:

connecting the second coupler and the interface for allowing the transfer of energy between the first coupler and the second coupler; and operating in: a first mode to allow at least one of the coupler current and the coupler voltage to be regulated; and operating in a second mode to allow the coupler current and the coupler voltage to be unregulated.

2. The station according to claim 1 including a DC energy storage device and wherein the switching module is responsive to the control signals for selectively connecting a storage device with the second coupler for allowing the transfer of energy between the couplers.

3. The station according to claim 2, wherein the switching module is responsive to the control signals for selectively disconnecting the storage device from the second coupler.

4. The station according to claim 2, wherein the switching module is responsive to the control signals for selectively connecting the storage device with the interface for allowing transfer of energy between the storage device and the external source.

5. The station according to claim 2, wherein the energy storage device has a device current and a device voltage and the switching module is responsive to the control signals for operating in a third mode for connecting the interface and the storage device such that at least one of the device current or device voltage is regulated by the interface.

6. The station according to claim 2, wherein, in a mode of operation, the switching module is responsive to the control signals for operating in a fourth mode for connecting the interface and/or the storage device with the second coupler for allowing the coupler current to be drawn, at least in part, from at least one of the interface or the energy storage device.

7. The station according to claim 5, wherein the coupler voltage is directly derived from the device voltage.

8. The station according to claim 1, wherein the first charging data is indicative of whether the station is to operate in the first mode or the second mode.

9. The station according to claim 1, wherein the interface includes a regulator for transferring energy with the external source and for providing an output current and an output voltage to transfer energy with at least one of a storage device and the second coupler, wherein at least one of the output current or the output voltage is regulated.

10. The station according to claim 9, wherein one or more of the device voltage and device current is defined, at least in part, by the respective output voltage and the output current.

11. The station according to claim 1, wherein the switching module, in a fifth mode, is responsive to the control signals for selectively transferring energy between the storage device and the second coupler, wherein at least one of the coupler voltage and coupler current and the device voltage and device current is regulated by the interface.

12. The station according to claim 9, wherein one or more of the coupler voltage and coupler current is defined, at least in part, by the respective output voltage and the output current.

13. The station according to claim 9 wherein, when transferring energy to the external source, the output voltage and the output current is defined, at least in part, respectively by at least one of: the coupler voltage and the coupler current; and a device voltage and a device current of the storage device.

14. The station according to claim 9, wherein the coupler current is derived from at least one of a device current of the storage device or the output current.

15. The station according to claim 1, wherein the interface includes a pair of interface terminals, wherein the second couplers include a pair of second coupler terminals, and wherein the interface terminals are directly connected to the second coupler terminals.

\* \* \* \* \*